United States Patent
Patel et al.

(10) Patent No.: US 10,665,023 B2
(45) Date of Patent: May 26, 2020

(54) SYSTEM AND METHOD FOR PROVIDING IMPROVED AUGMENTED REALITY CONTENT

(71) Applicant: Disney Enterprises, Inc., Burbank, CA (US)

(72) Inventors: Mehul Patel, Burbank, CA (US); Steven M. Chapman, Burbank, CA (US); Benjamin F. Havey, Burbank, CA (US); Joseph Popp, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 53 days.

(21) Appl. No.: 15/854,593

(22) Filed: Dec. 26, 2017

(65) Prior Publication Data

US 2019/0197781 A1    Jun. 27, 2019

(51) Int. Cl.
*G06T 19/00* (2011.01)
*G06T 7/571* (2017.01)

(52) U.S. Cl.
CPC ............ *G06T 19/006* (2013.01); *G06T 7/571* (2017.01); *G06T 2207/10148* (2013.01); *G06T 2210/36* (2013.01)

(58) Field of Classification Search
None
See application file for complete search history.

(56) References Cited

U.S. PATENT DOCUMENTS

| 2016/0253844 A1* | 9/2016 | Petrovskaya | G06Q 50/01 345/633 |
| 2018/0045963 A1* | 2/2018 | Hoover | G06F 3/011 |
| 2019/0011703 A1* | 1/2019 | Robaina | G02B 27/01 |

* cited by examiner

*Primary Examiner* — Peter Hoang
(74) *Attorney, Agent, or Firm* — Dorsey & Whitney LLP

(57) ABSTRACT

Systems, devices, and methods are disclosed for generating improved AR content. An electronic device includes circuitry coupled to a memory storing instructions that, when executed, cause the circuitry to obtain frame data for a frame captured using a camera. The frame data includes a level of focus for one or more frame objects in the frame. The circuitry is caused to associate an augmented reality object with at least one of the one or more frame objects. The circuitry is caused to determine a fit factor between a level of focus of the augmented reality object and level of focus of the at least one of the frame objects associated with the augmented reality object. Additionally, the circuitry is caused to, if the fit factor does not satisfy a threshold, apply a decrease to the level of focus of the augmented reality object in order to generate an increased fit factor.

18 Claims, 13 Drawing Sheets

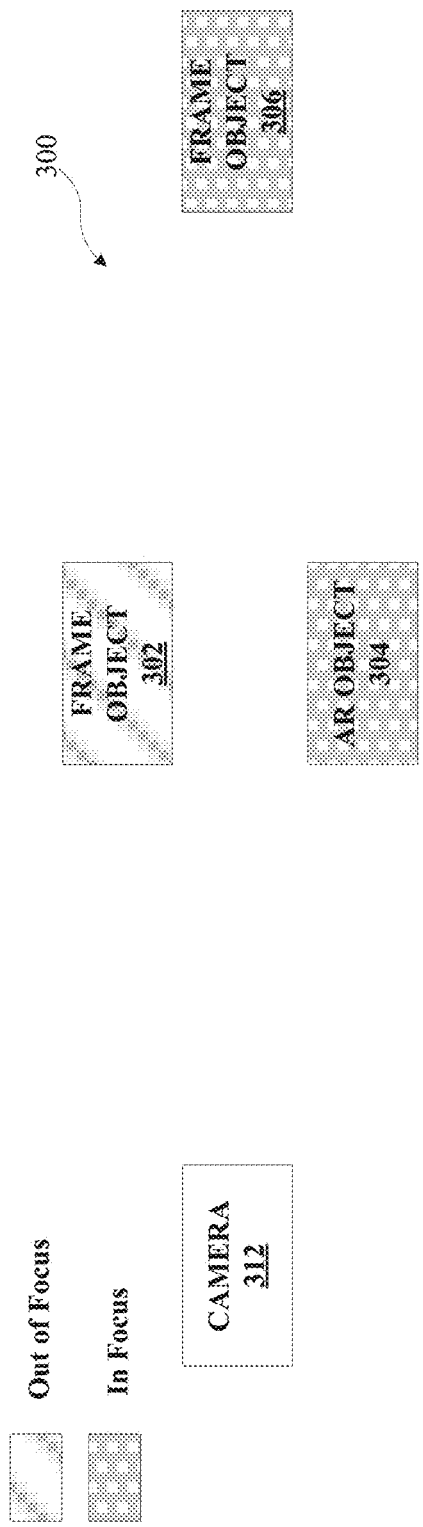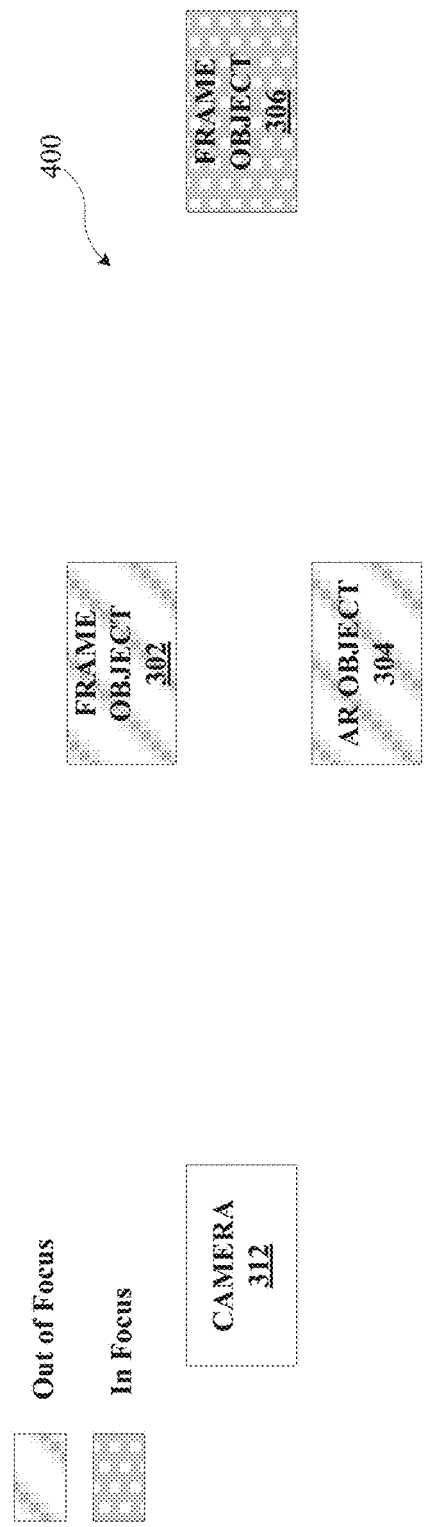

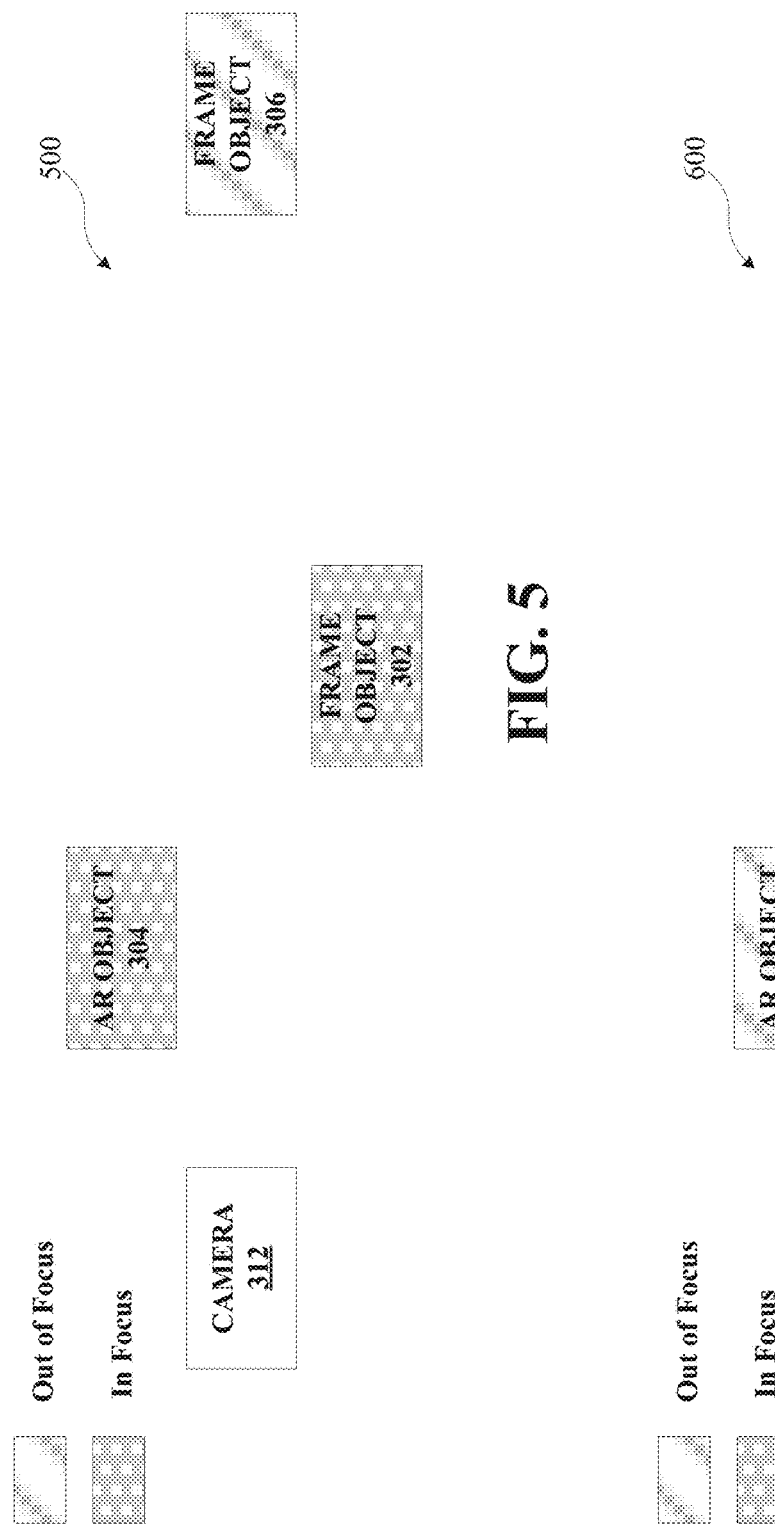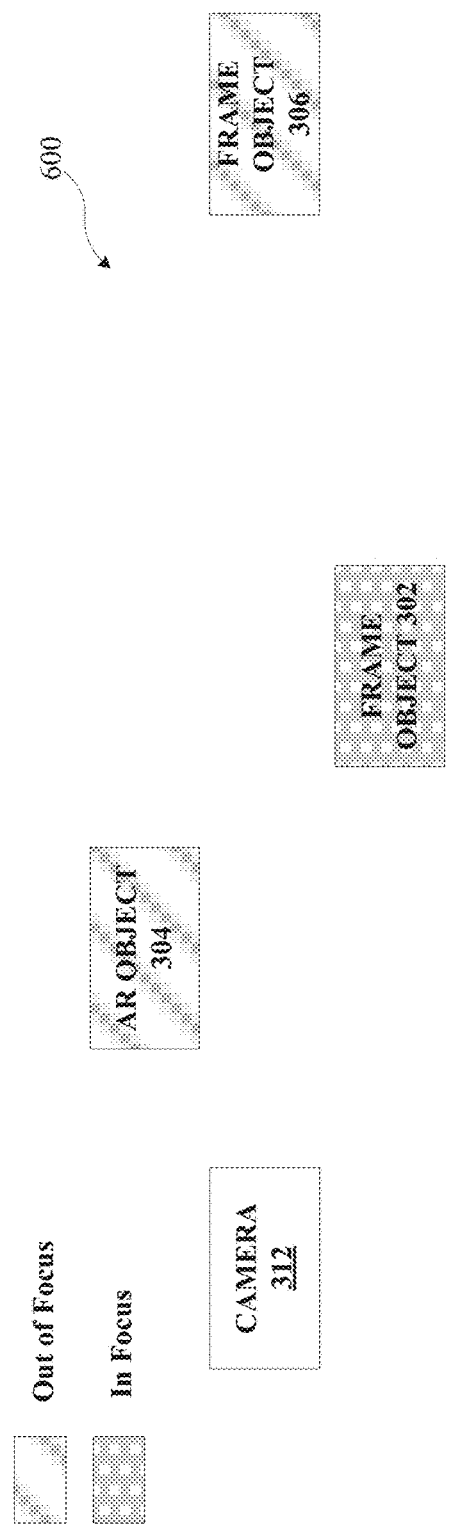
FIG. 5
FIG. 6

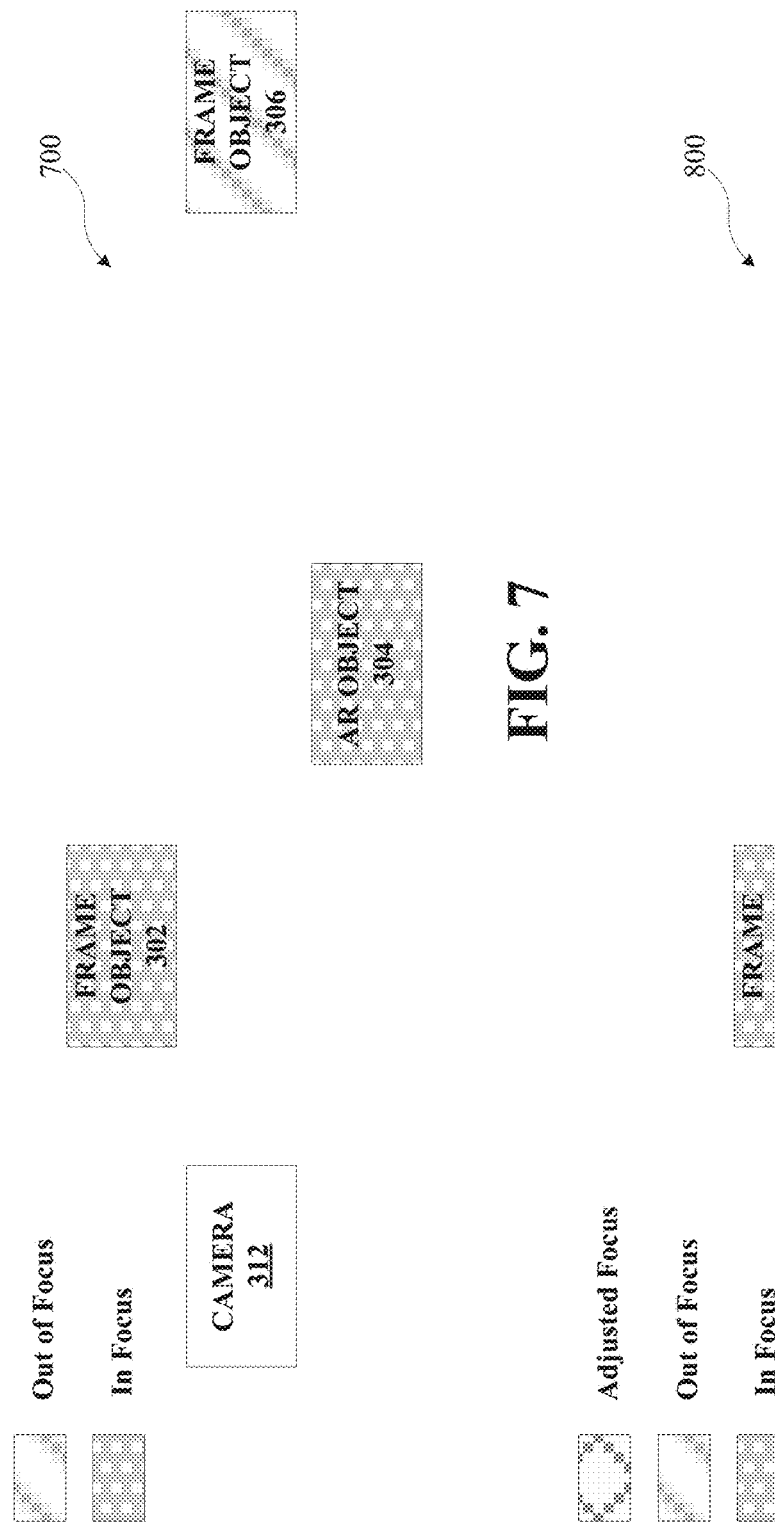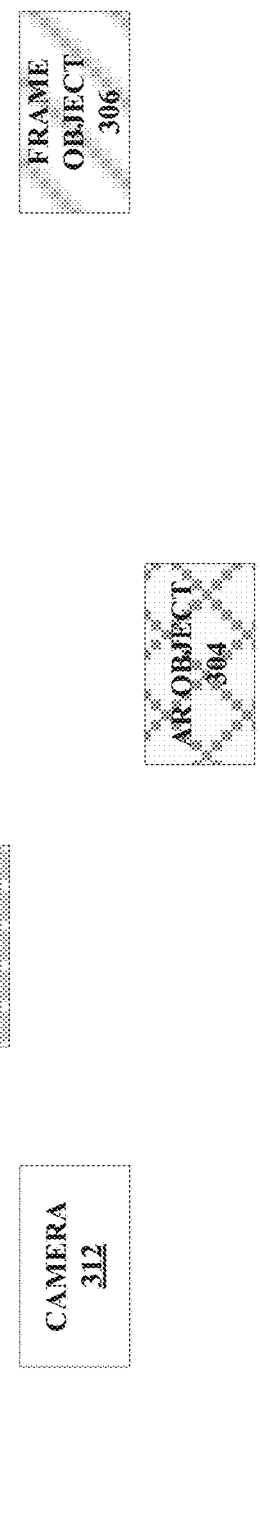
FIG. 7
FIG. 8

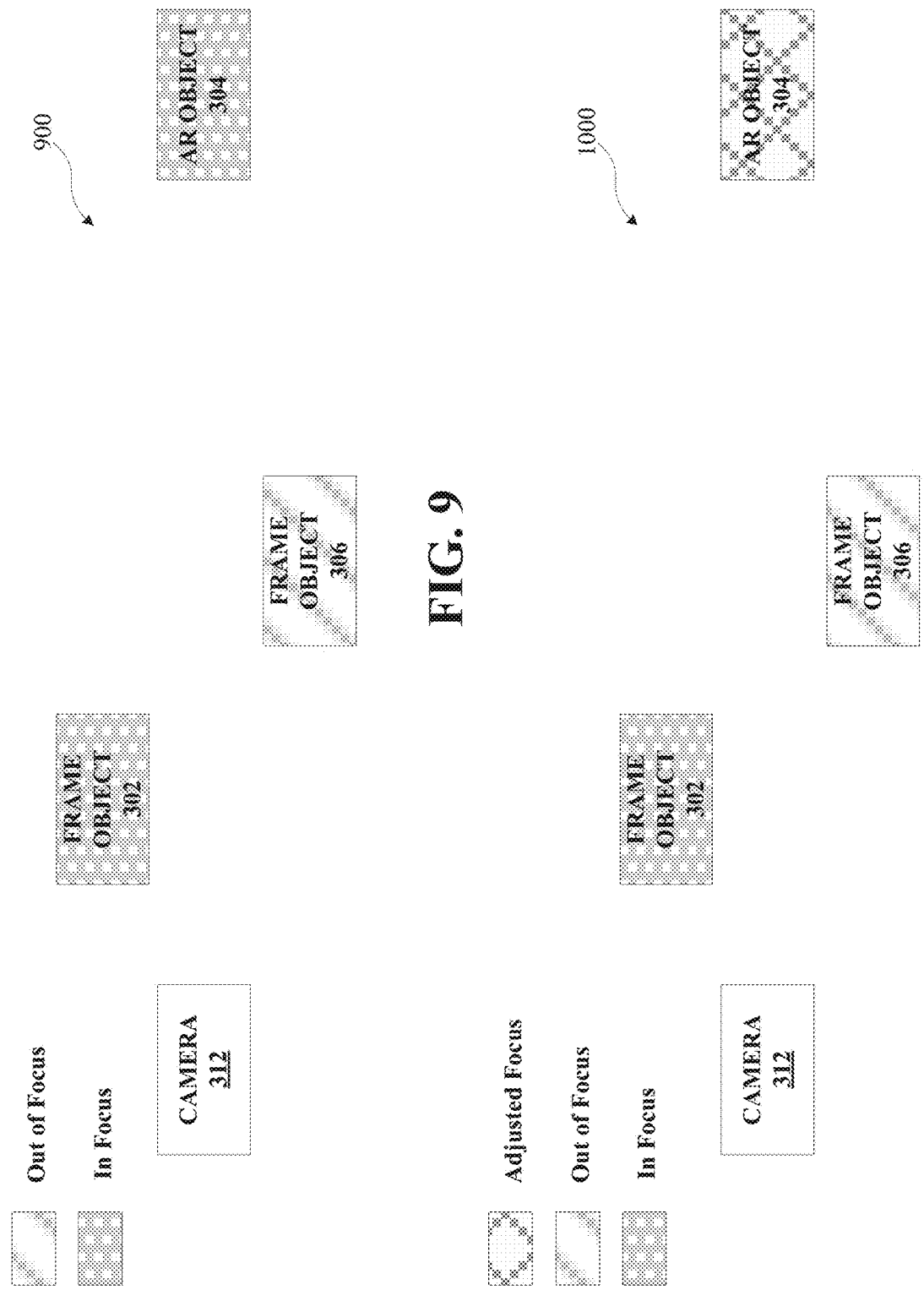

USE ESTIMATED PROXIMITY TO GROUP AR OBJECT WITH FRAME
OBJECTS
1120

FIG. 11B

USE ESTIMATED DEPTH TO GROUP AR OBJECT WITH FRAME OBJECTS
1122

FIG. 11C

DETERMINE LEVEL OF FOCUS FOR AR OBJECT USING INTERPOLATION
OR EXTRAPOLATION
1124

FIG. 11D

INCREASE FOCUS MATCH BETWEEN AR OBJECT AND FRAME OBJECT
1130

FIG. 11E

CONTROL LEVEL OF FOCUS FOR AR OBJECT TO CONVERGE WITHIN PREDETERMINED RANGE
1132

FIG. 11F

SET LEVEL OF FOCUS FOR AR OBJECT TO BE WITHIN RANGE OF LEVEL OF FOCUS FOR FRAME OBJECT
1134

FIG. 11G

SYSTEM AND METHOD FOR PROVIDING IMPROVED AUGMENTED REALITY CONTENT

BACKGROUND

Cameras, such as video cameras and still cameras, can be used to capture an image, a series of images, or a video of a physical, real-world scene. Certain devices, by way of an augmented reality (AR) application or functionality, may be configured to insert virtual objects into the captured images or video before and/or while the images or video are displayed.

SUMMARY

Some systems for providing augmented reality (AR) content are limited because inserted AR objects do not match or fit with the appearance of nearby or associated objects in an image, and hence such AR objects do not appear realistic in the context of the image. In such systems, where AR objects are not modified to better match or fit with the appearance of nearby objects, the AR objects may be distracting, i.e., draw a viewer's eye in a manner that is undesirable.

In view of the above shortcomings in certain systems, there is a need for a platform that provides improved augmented reality content, including in some examples, by setting or modifying a level of focus of an augmented reality object, where the level of focus is set/modified to better match, fit with, or relate to that of frame objects in the image into which the AR object is inserted. In particular, there is a need for such platforms that enable control over characteristics of the AR object, including for example where such control and modification of the AR object is implemented on the fly during or in connection with the capture of the underlying image. In this connection, embodiments of the present disclosure include systems, methods, and devices, capable of providing AR content, as well as interconnected processors and/or circuitry, to set and/or modify characteristics of the AR content based on characteristics of associated image features, including in some examples, by setting or modifying a level of focus of an augmented reality object.

In accordance with aspects of the present disclosure, an electronic device generates improved augmented reality content. The electronic device includes a camera adapted to capture one or more frames. The electronic device further includes an augmented reality component coupled to the camera and a memory. The memory stores instructions that, when executed, cause the augmented reality component to perform a number of operations. One such operation is to obtain frame data for a frame one or more frames captured using the camera. The frame data includes a level of focus for one or more frame objects in the frame. Another such operation is to insert an augmented reality object into the frame. Yet another such operation is to group the augmented reality object with at least one of the one or more frame objects. Another such operation is to use the frame data to set a level of focus for the augmented reality object to increase a fit between the level of focus of the augmented reality object and the level of focus of the at least one of the frame objects grouped with the augmented reality object.

In embodiments, the memory further stores instructions that, when executed, cause the augmented reality component to use a display of the electronic device to display the frame and the augmented reality object with the fit increased while the camera is capturing the one or more frames.

In embodiments, the level of focus for the augmented reality object is set to be within a range of the level of focus of the at least one of the frame objects grouped with the augmented reality object.

In embodiments, the memory further stores instructions that, when executed, cause the augmented reality component to use an estimated proximity of the augmented reality object to the at least one of the one or more frame objects to group the augmented reality object with the at least one of the one or more frame objects.

In accordance with additional aspects of the present disclosure, a method for generating improved augmented reality content includes a number of operations. The method includes generating a focus map using frame data that represents a frame. The frame includes one or more frame objects. The focus map includes a level of focus for the one more frame objects. The method further includes grouping an augmented reality object with at least one of the frame objects. The augmented reality object includes a level of focus. The method further includes using the focus map for the at least one frame object grouped with the augmented reality object to cause a modification to the level of focus for the augmented reality object. The modification to the level of focus for the augmented reality object may increase a match between the level of focus for the at least one frame object and the level of focus for the augmented reality object.

In embodiments, using the focus map for the at least one frame object grouped with the augmented reality object to cause the modification to the level of focus for the augmented reality object includes controlling the level of focus for the augmented reality object to converge within a range defined by first and second threshold levels of focus.

In embodiments, grouping the augmented reality object with the at least one of the frame objects is done using an estimated proximity of the augmented reality object to the at least one of the frame objects.

In embodiments, grouping the augmented reality object with the at least one of the frame objects is done using an estimated depth for the augmented reality object and an estimated depth for the at least one of the frame objects. Grouping the augmented reality object with the at least one of the frame objects may include grouping the augmented reality object with a first frame object and a second frame object. The estimated depth for the at least one of the frame objects may include a first estimated depth for the first frame object and a second estimated depth for the second frame object.

The estimated depth for the augmented reality object may be greater than the first estimated depth and less than the second estimated depth. In embodiments, using the focus map for the at least one frame object grouped with the augmented reality object to cause the modification to the level of focus for the augmented object includes determining the level of focus for the augmented reality object using interpolation.

In some cases, the estimated depth for the augmented reality object is less than the first estimated depth and the second estimated depth or is greater than the first estimated depth and the second estimated depth. In embodiments, using the focus map for the at least one frame object grouped with the augmented reality object to cause the modification to the level of focus for the augmented object includes determining the level of focus for the augmented reality object using extrapolation.

In embodiments, grouping the augmented reality object with the at least one of the frame objects includes grouping the augmented reality object with a first frame object and a second frame object. The level of focus for the at least one frame object may include a first level of focus for the first frame object and a second level of focus for the second frame object. In some cases, using the focus map for the at least one frame object grouped with the augmented reality object to cause a modification to the level of focus for the augmented object includes determining the level of focus for the augmented reality object using one of interpolation and extrapolation.

Embodiments of the method further include using a camera to capture the frame. The frame may be a photograph or one of a series of frames of a video captured using the camera.

Additional aspects of the present disclosure involve an electronic device for generating improved augmented reality content. The electronic device includes circuitry coupled to a memory. The memory stores instructions that, when executed, cause the circuitry to perform a number of operations. One such operation is to obtain frame data for a frame of one or more frames captured using a camera. The frame data includes a level of focus for one or more frame objects in the frame. Another such operation is to associate an augmented reality object with at least one of the one or more frame objects. Another such operation is to determine a fit factor between a level of focus of the augmented reality object and level of focus of the at least one of the frame objects associated with the augmented reality object. Yet another such operation is to, if the fit factor does not satisfy a threshold, apply a decrease to the level of focus of the augmented reality object in order generate an increased fit factor.

In embodiments, the memory further stores instructions that, when executed, cause the circuitry to perform additional operations. One such operation is to, responsive to the decrease applied to the level of focus of the augmented reality object, determine whether the increased fit factor satisfies the threshold. Another such operation is to, if the increased fit factor does not satisfy the threshold, apply a further decrease to the level of focus of the augmented reality object.

In embodiments, the electronic device includes the camera. The memory may further stores instructions that, when executed, cause the circuitry to insert the augmented reality object into the frame. The augmented reality object may include a three-dimensional model.

In embodiments, the electronic device further includes a transceiver coupled to the circuitry and the memory. The memory may further stores instructions that, when executed, cause the transceiver to receive the frame data via a communication medium. The camera may be embedded on a remote device communicatively coupled to the electronic device via the communication medium.

In embodiments, the augmented reality object is associated with a first frame object and a second frame object. The level of focus of the at least one of the frame objects associated with the augmented reality object may include a first level of focus for the first frame object and a second level of focus for the second frame object. A degree of the decrease applied to the level of focus of the augmented reality object may be determined using one of interpolation and extrapolation with respect to the first level of focus and the second level of focus.

BRIEF DESCRIPTION OF THE DRAWINGS

Further aspects of the present disclosure will be more readily appreciated upon review of the detailed description of the various disclosed embodiments, described below, when taken in conjunction with the accompanying figures.

FIG. 3 illustrates an example scene arrangement in connection with embodiments of the disclosure.

FIG. 4 illustrates an example scene arrangement in connection with embodiments of the disclosure.

FIG. 5 illustrates an example scene arrangement in connection with embodiments of the disclosure.

FIG. 6 illustrates an example scene arrangement in connection with embodiments of the disclosure.

FIG. 7 illustrates an example scene arrangement in connection with embodiments of the disclosure.

FIG. 8 illustrates an example scene arrangement in connection with embodiments of the disclosure.

FIG. 9 illustrates an example scene arrangement in connection with embodiments of the disclosure.

FIG. 10 illustrates an example scene arrangement in connection with embodiments of the disclosure.

FIG. 11B is an operational flow diagram illustrating additional aspects of operations that may be performed in accordance with additional embodiments of the disclosure.

FIG. 11C is an operational flow diagram illustrating additional aspects of operations that may be performed in accordance with additional embodiments of the disclosure.

FIG. 11D is an operational flow diagram illustrating additional aspects of operations that may be performed in accordance with additional embodiments of the disclosure.

FIG. 11E is an operational flow diagram illustrating additional aspects of operations that may be performed in accordance with additional embodiments of the disclosure.

FIG. 11F is an operational flow diagram illustrating additional aspects of operations that may be performed in accordance with additional embodiments of the disclosure.

FIG. 11G is an operational flow diagram illustrating additional aspects of operations that may be performed in accordance with additional embodiments of the disclosure.

The figures are described in greater detail in the description and examples below, are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

Embodiments of the present disclosure are directed to systems, methods, and devices, for providing improved AR content. In various deployments described herein, the AR content is modified, for example with respect to a focus level of the AR content, to better match, fit with, or otherwise relate to a level of focus of one or more frame objects associated with the AR object, in a frame captured using a camera. This focus matching or focus setting/fitting of the AR object vis-à-vis the frame object(s) may enable the generation of AR content that appears more realistic and less distracting to viewers.

The details of some example embodiments of the systems, methods, and devices of the present disclosure are set forth in this description and in some cases, in other portions of the disclosure. Other features, objects, and advantages of the disclosure will be apparent to one of skill in the art upon examination of the present disclosure, description, figures, examples, and claims. It is intended that all such additional systems, methods, devices, features, and advantages be included within this description (whether explicitly or by reference), be within the scope of the present disclosure, and be protected by one or more of the accompanying claims.

Figure 1A:
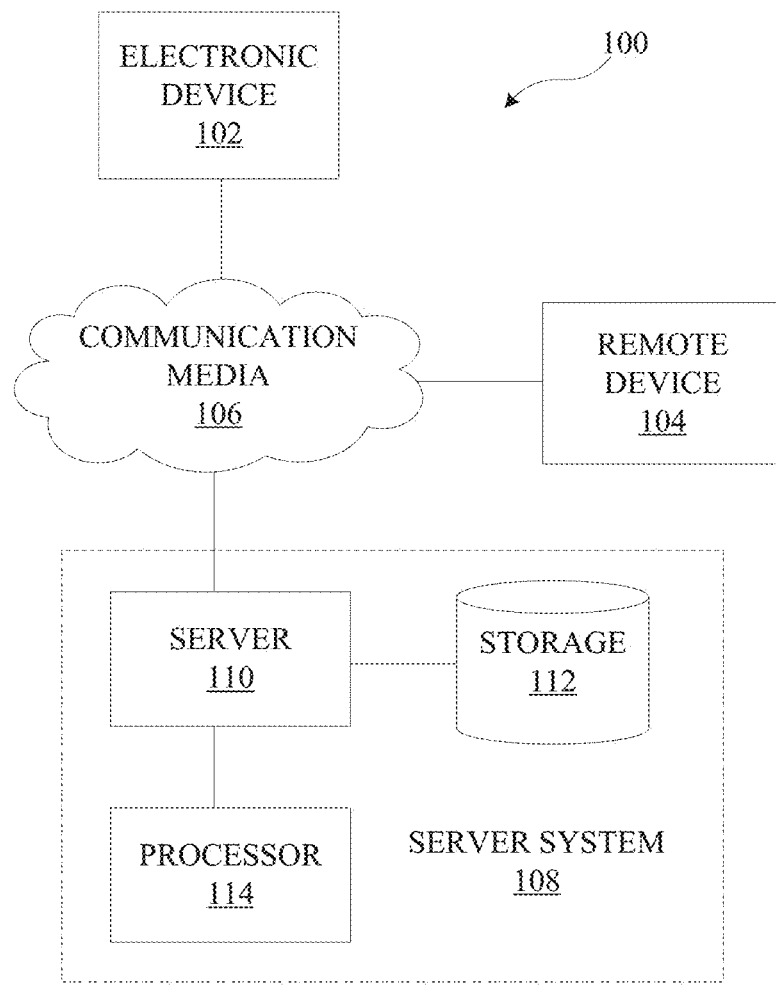
FIG. 1A illustrates an example environment in which embodiments of the disclosure may be implemented.

FIG. 1A depicts example environment 100, which may be used in connection with implementing embodiments of the disclosed systems, methods, and devices. By way of example, the various below-described components of FIG. 1A may be used to provide improved AR content, including, e.g., where the AR content includes an AR object that is better matched, fit with, or otherwise related to associated frame objects in a frame captured by a camera that may be embedded in an electronic device. The increased matching, improved fitting, or improved relationship between the AR object and the frame objects may be, for example, with respect to a focus level of the AR object and frame objects. The matching/fitting/setting may be facilitated using frame data gathered by the camera, including, by way of illustration, a focus map for the captured frame. In embodiments, frame data can include any information related to or generated or extracted from captured content, such as information representing objects in a camera frame (e.g., pixel information), information indicating attributes of such objects, such as the relative or absolute depth, focus, shape, and/or color of such objects, lighting/shading information, information regarding the movement trajectory of such objects, and so forth. Accordingly, environment 100 may enable the generation of AR content that may appear more realistic to viewers and may be less distracting to viewers, where the inserted AR object is better integrated with the real-world frame objects of the captured content.

As shown in FIG. 1A, environment 100 may include one or more of electronic device 102, remote device 104, and server system 108. Electronic device 102 can be coupled to remote device 104 and/or server system 108 via communication media 106. As will be described in detail herein, electronic device 102, remote device 104, and/or server system 108 may exchange communications signals, including frame data and other aspects of content for display on electronic device 102, via communication media 106.

Electronic device 102 and/or remote device 104 may include a variety of electronic computing devices, such as, for example, a smartphone, tablet, laptop, wearable device, etc. By way of example, electronic device 102 and/or remote device 104 may include electronic devices adapted for augmented reality and/or virtual reality applications, such as glasses, a headset, gloves, etc. Here, a GUI of electronic device 102 may perform such functions as accepting user input and displaying AR or other content. The GUI may be provided by various operating systems known in the art, such as, for example, iOS, Android, Windows Mobile, Windows, Mac OS, Chrome OS, Linux, Unix, a gaming platform OS (e.g., Xbox, PlayStation, Wii), etc. In various embodiments, communication media 106 may be based on one or more wireless communication protocols such as Bluetooth®, ZigBee, 802.11 protocols, Infrared (IR), Radio Frequency (RF), 2G, 3G, 4G, 5G, etc., and/or wired protocols and media. Communication media 106 may be implemented as a single medium in some cases.

As mentioned, electronic device 102 and remote device 104 may take a variety of forms, such as a desktop or laptop computer, a smartphone, a tablet, a smartwatch or other wearable electronic device, a television or other audio or visual entertainment device or system, a camera (including still shot or video) or the like. Electronic device 102 and remote device 104 may communicate with other devices and/or with one another over communication media 106 with or without the use of server system 108. In various embodiments, electronic device 102, remote device 104, and/or server system 108 may be used to perform various processes described herein and/or may be used to execute various operations described herein with regard to one or more disclosed systems and methods. Upon studying the present disclosure, one of skill in the art will appreciate that environment 100 may include multiple electronic devices 102, remote devices 104, communication media 106, server systems 108, servers 110, processors 114, and/or storage 112.

As mentioned, communication media 106 may be used to connect or communicatively couple electronic device 102, remote device 104, and/or server system 108 to one another or to a network, and communication media 106 may be implemented in a variety of forms. For example, communication media 106 may include an Internet connection, such as a local area network (LAN), a wide area network (WAN), a fiber optic network, internet over power lines, a hard-wired connection (e.g., a bus), and the like, or any other kind of network connection. Communication media 106 may be implemented using any combination of routers, cables, modems, switches, fiber optics, wires, radio (e.g., microwave/RF links), and the like. Further, communication media 106 may be implemented using various wireless standards, such as Bluetooth, Wi-Fi, 3GPP standards (e.g., 2G GSM/GPRS/EDGE, 3G UMTS/CDMA2000, 4G LTE/LTE-U/LTE-A, 5G), etc. Upon reading the present disclosure, one of skill in the art will recognize other ways to implement communication media 106 for communications purposes.

Likewise, though not shown, it will be appreciated that a similar communication medium may be used to connect or communicatively couple server 110, processor 114, and/or storage 112 to one another in addition to other elements of environment 100. In example implementations, communication media 106 may be or include a wired or wireless wide area network (e.g., cellular, fiber, and/or circuit-switched connection, etc.) for electronic device 102, remote device 104, and/or server system 108, which may be relatively geographically disparate; and in some cases, aspects of communication media 106 may involve a wired or wireless local area network (e.g., Wi-Fi, Bluetooth, unlicensed wireless connection, USB, HDMI, standard AV, etc.), which may be used to communicatively couple aspects of environment 100 that may be relatively close geographically.

Server system 108 may provide, receive, collect, or monitor information from electronic device 102 and/or remote device 104, such as, for example, input or characteristics relating to AR objects displayed on electronic device 102, underlying frame data and related content, security and encryption information, and the like. Such input relating to AR objects may include user input provided by a user in association with AR objects displayed on electronic device 102. Server system 108 may be configured to receive or send such information via communication media 106. This information may be stored in storage 112 and may be processed using processor 114. For example, processor 114 may include an analytics engine capable of performing analytics on information that server system 108 has collected, received, etc. from electronic device 102 and/or remote device 106. In embodiments, server 110, storage 112, and processor 114 may be implemented as a distributed computing network or as a relational database or the like.

Server 110 may include, for example, an Internet server, a router, a desktop or laptop computer, a smartphone, a tablet, a processor, a module, or the like, and may be implemented in various forms, including, for example, an integrated circuit or collection thereof, a printed circuit board or collection thereof, or in a discrete housing/package/rack or multiple of the same. In embodiments, server 110 directs communications between electronic device 102 and remote device 104 over communication media 106. For example, server 110 may process and exchange messages between electronic device 102 and remote device 104 that relate to frame data, AR objects, and/or AR content. Server 110 may update information stored on electronic device 102 and/or remote device 104, for example, by delivering applications thereto. Server 110 may send/receive information to/from electronic device 102 and/or remote device 104 in real time or sporadically. Further, server 110 may implement cloud computing capabilities for electronic device 102 and/or remote device 104.

Figure 1B:
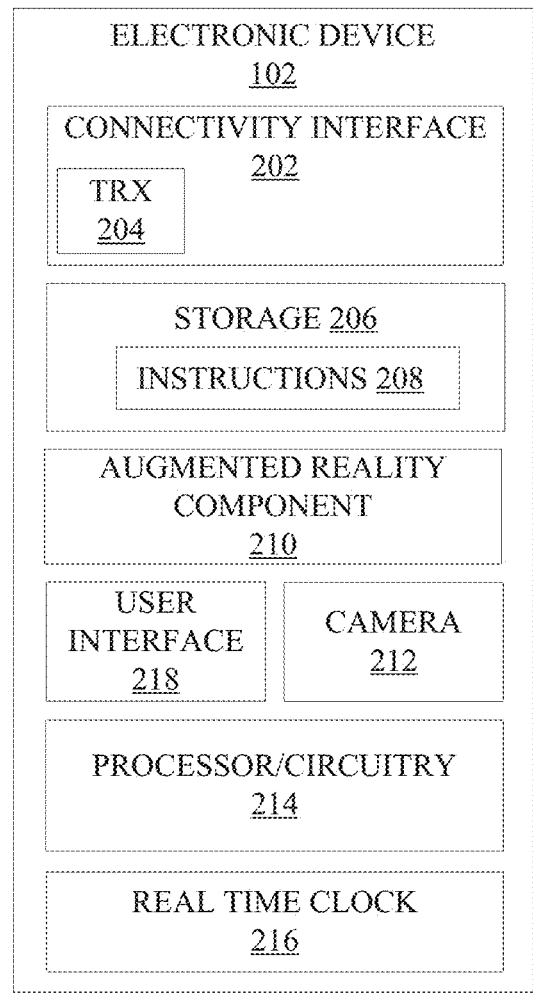
FIG. 1B illustrates an example electronic device according to embodiments of the disclosure.

FIG. 1B depicts example electronic device 102, which includes examples of additional aspects of the present disclosure that may be implemented in connection with example environment 100. As illustrated, electronic device 102 may include connectivity interface 202, which may further include transceiver 204 to communicatively couple electronic device 102 to, for example, remote device 104 and/or server system 108 via communication media 106. In the illustrated embodiment, electronic device 102 further includes storage 206 (which in turn may store instructions 208), augmented reality component 210, camera 212, processor/circuitry 214, real time clock 216 (which may be used to provide a clock or multiple clocks for electronic device 102), and user interface 218, which may be used to present AR and other content to a viewer using a display of electronic device 102. A bus (not shown in FIG. 2) may be used to interconnect the various elements of electronic device 102 and transfer data between these elements. It should be appreciated at this juncture that in embodiments, remote device 104 may be substantially similar to electronic device 102, including all or some of the components of electronic device 102 shown in FIG. 1B.

In FIG. 1B, connectivity interface 202 may interface electronic device 102 to communication media 106, such that electronic device 102 may be communicatively coupled to remote device 104 and/or server system 108 via communication media 106. Transceiver 204 of connectivity interface 202 may include multiple transceiver modules operable on different wireless standards. Transceiver 204 may be used to send/receive frame content and/or frame data from remote device 104 and/or server system 108, and in some cases to send/receive information related to an AR object and/or AR content. Additionally, connectivity interface 202 may include additional components for controlling radio and/or wired connections, such as baseband and/or Ethernet modems, audio/video codecs, and so on.

In embodiments, transceiver 204 may utilize Bluetooth, ZIGBEE, Wi-Fi, GPS, cellular technology, or some combination thereof. Further, although FIG. 1B illustrates a single transceiver 204 for transmitting/receiving information, separate transceivers may be dedicated for communicating particular types of data or for doing so in particular fashions. In some cases, transceiver 204 may include a low energy transmitter/receiver such as a near field communications (NFC) transmitter/receiver or a Bluetooth Low Energy (BLE) transmitter/receiver. In further example implementations, separate wireless transceivers may be provided for receiving/transmitting high fidelity audio and/or video data. In yet additional embodiments, a wired interface (e.g., micro-USB, HDMI, etc.) may be used for communicating data between electronic device 102 and remote device 104 and/or server system 108.

Storage 206 may include volatile memory (e.g., RAM) and/or non-volatile memory (e.g., flash storage), may include any of EPROM, EEPROM, cache, or may include some combination/variation thereof. In various embodiments, storage 206 may store user input data and/or other data collected by electronic device 102 (e.g., frame data, information related to AR objects, etc.). Storage 206 may also be used to store downloaded content (e.g., movies, photos, and so on) for later retrieval and use, e.g., in connection with the generation and provision of AR content. Additionally, storage 206 may store instructions 208 that, when executed using processor/circuitry 214, for example, can cause electronic device 102 to perform various operations that will be described in further detail herein.

In various embodiments, a user may interact with electronic device 102 via user interface 218, which may include a display (not shown) for displaying frame data and/or AR content to a user. By way of example, such a display may be a touchscreen display that accepts various hand gestures as inputs. Instructions 208 may be used for processing and/or presenting AR content using electronic device 102, according to various operations described herein.

Instructions 208 may be downloaded, installed, and/or initially configured/setup on electronic device 102. For example, electronic device 102 may obtain instructions 208 from server system 108, or from another source accessed via communication media 106, such as an application store or the like. Following installation and setup, instructions 208 may be used to access frame data and/or modify AR objects, as will be described herein. Instructions 208 may also be used to interface with other electronic devices, for example, remote device 104 and/or server system 108, to receive therefrom frame data captured by a camera of remote device 104, and/or content stored at server system 108, etc., as will be described herein.

Instructions 208 may include various code/functional modules, such as, for example, a frame data, a focus mapping, a depth estimation module, an AR object modification module, etc. These modules may be implemented separately or in combination. Each module may include computer-readable media and have computer-executable code stored thereon, such that the code may be operatively coupled to and/or executed by processor/circuitry 214 to perform specific functions (e.g., as described herein with regard to various operations and flow diagrams, etc.) with respect to providing AR content and tasks related thereto. Instructions 208 may include a native application modified with a software design kit (e.g., depending on the operating system) in order to carry out the functionalities/features described herein.

As shown in FIG. 1B, electronic device 102 includes AR component 210. In some embodiments, augmented reality component 210 may be integrated into and/or implemented in connection with instructions 208. In some cases, aspects of instructions 208 relating to AR features may be considered to be part of AR component 210. AR component 210 may include one or more sensors, such as an accelerometer, a gyroscope, etc. AR component 210 may enable electronic device 102 to be capable of displaying a real-time view of a physical, real-world environment while altering elements within the displayed view of the environment. As such, AR component 210 may enable electronic device 102 to display a view of the real world while augmenting (e.g., adding or modifying) elements using computer graphics technology. AR component 210 may be communicatively coupled to camera 212 (or multiple cameras 212) and used to capture a view of the real-world environment and may further include computer software and/or hardware configured to augment elements of the captured scene. When a user looks through or at electronic device 102, AR component 210 may be used to enable to the viewer to see an augmented view of the physical real-world environment in which the user is located. Camera(s) 212 may include one or more cameras for capturing the visual scene, which may then be displayed to a user through user interface 218 (e.g., display thereof), which may include a see-through display. As used herein, a visual scene may refer to a view(s) of the real-world environment from which AR content is generated. For instance, a visual scene may be a series of images of a real-world environment.

Referring further to FIG. 1B, as mentioned above, electronic device 102 may also include processor/circuitry 214. Processor/circuitry 214 may include a processor or processor modules, including, by way of example, an applications processor that interfaces with and/or controls other elements of electronic device 102 (e.g., connectivity interface 202, instructions 208, storage 206, user interface 218, camera 212, and AR component 210). Processor/circuitry 214 may include a controller that provides various controls (e.g., interfaces with buttons and switches) related to the operation of camera 212, user interface 218, and the like, and interfaces with drivers of various audio/visual components of electronic device 102. Additionally, the controller may include various controls related to the gathering of frame data, calculations made using the frame data, as well as the setting/modification/control of characteristics of AR objects, such as will be described in further detail herein.

Processor/circuitry 214 may include processors (including, in some instances, logic circuits), memory, a battery and power circuitry, and other circuitry drivers for periphery components, such as camera 212 and audio/visual/haptic interfaces that may be included in user interface 218. Processor/circuitry 214 and any processors thereof may include logic circuits for receiving, processing, and/or storing content or information received and/or generated by, and/or data input to, electronic device 102, and content or information to be transmitted or delivered by electronic device 102. More particularly, as shown in FIG. 1B, processor/circuitry 214 may be coupled by a bus (not shown) to a display of user interface 218 as well as to connectivity interface 202 and storage 206 (including instructions 208), as well as to AR component 210 and camera 212. Hence, processor/circuitry 214 may receive and process electrical signals generated by these respective elements and thus perform various functions. By way of example, processor/circuitry 214 may access stored content from storage 206 at the direction of instructions 208, and process the stored content for display and/or output by user interface 218. Additionally, processor/circuitry 214 may process the stored content for transmission via connectivity interface 202 and communication media 106 to remote device 104 and/or server system 108.

In further embodiments, logic circuits of processor/circuitry 214 may further detect, calculate, and/or store data (e.g., frame data) received from camera 212 or another remote source (e.g., from a camera of remote device 104 or from server system 108). The logic circuits may use this input to set/modify aspects of an AR object insertable into an image being displayed using user interface 218. Processor/circuitry 214 may be used to drive/control and/or gather information from other peripheral components not shown in detail in FIG. 1B. For example, processor/circuitry 214 may interface with camera lenses and modules of camera 212, including flashes to be operated in connection therewith, depth sensors, etc., that may be used to capture, generate, and/or calculate frame information, as will be described herein, including mechanisms and information relating to a focus map or profile of a frame captured using camera 212, relating to lighting, light sensors, infrared input/outputs, and so on vis-à-vis camera 212, etc. Processor/circuitry 214 may also interface with video input/output mechanisms such as HDMI, USB, and the like.

In embodiments, remote device 104 includes components that may be used to gather frame content/data, such as a camera (which may be substantially similar to camera 212). Server system 108 may store, using storage 112, photo/video content, including frame data that may be used by electronic device 102 to generate improved AR content, as will be described herein.

Having described some of the various elements of environment 100 and electronic device 102 shown in FIGS. 1A and 1B, an example embodiment using some of these elements for the generation of improved AR content will now be provided. In this non-exhaustive example, electronic device 102 may be used to generate improved AR content, as follows. Electronic device 102 may use camera 212 to capture one or more frames. AR component 210 may be coupled to camera 212 and storage 216. Storage 216 may store instructions 208 that when executed by processor circuitry 214 cause AR component 210 to obtain frame data for the one or more frames captured using camera 212. The frame data includes a level of focus for frame object(s) in the frame. AR module 210 may insert an AR object into the frame and group the AR object with the frame object(s). AR component 210 may use the frame data to set a level of focus for the AR object based on level(s) of focus of the frame object(s). User interface 218 may then provide the resulting AR content to a user, for example, via a display of electronic device 102. Of course, many variations on this example are possible and within the scope of the present disclosure. This example and aspects thereof may be applied in connection with various embodiments illustrated and/or described in connection with other embodiments described herein.

Figure 2:
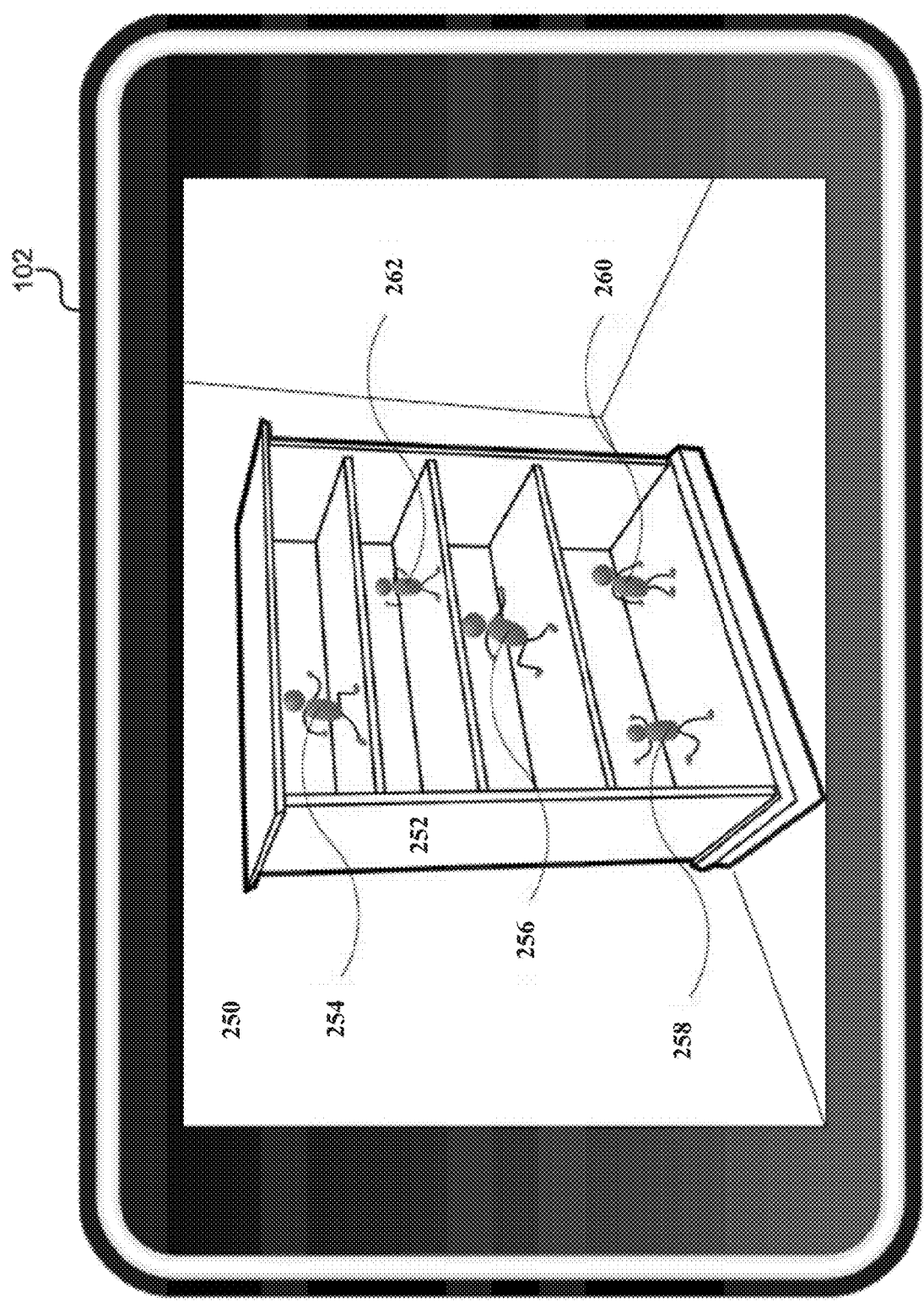
FIG. 2 illustrates an example of augmented reality content according to embodiments of the disclosure.

FIG. 2 illustrates an example of augmented reality content according to embodiments of the disclosure. In this example, the augmented reality content is displayed on electronic device 102, which in this case is implemented as a tablet or smart phone. As shown in FIG. 2, the augmented reality content includes frame 250, frame object 252 (which, in this example, is a bookshelf), and augmented reality objects 254 through 260. It should be appreciated that additional frame objects other than frame object 252 may be included in frame 250.

FIGS. 3 through 10 illustrate example scene arrangements in connection with embodiments of the disclosure. These example scene arrangements will now be described in order to provide, by way of example, insight into how AR objects may be modified in connection with generating improved AR content according to embodiments of the disclosure. FIG. 3 shows example arrangement 300, which includes camera 312, frame object 302, AR object 304, and frame object 306. Frame objects 302 and 306 may be part of a frame captured by camera 312, where the frame includes additional frame objects not shown in FIG. 3. Frame objects 302 and 306 may include, for example, any object that may be captured in a photograph or video, such as a human or animal, vegetation, other background scenery, or other inanimate objects. As shown in FIG. 3, in arrangement 300, frame object 302 may be closer than frame object 306 to camera 312. In some cases, this may result in a different level of focus being applied as between frame objects 302 and 306. For example, camera 312 in arrangement 300 is focusing on frame object 306, where frame object 302 is in the foreground and out of focus.

AR object 304 is shown in example arrangement 300 as being roughly equidistant with frame object 302 from camera 312. AR object 304, in embodiments, may include any virtual or other object inserted into the frame captured by camera 312 or generated otherwise. Nonlimiting examples of AR object 304 include two-dimensional or three-dimensional models or shapes, such as models of characters, text, arrows, inanimate objects, or the like. AR object 304 may be any visual object whether real or virtual/synthesized/illustrated that may be used to augment the frame. AR object 304 may include shading, shadows (which may in some cases extend therefrom), haze, saturation, color distributions, etc.

As is indicated in FIG. 3, in this case, frame object 302 is out of focus, while AR object 304 and frame object 306 are in focus initially. It should be appreciated that in some cases, frame object 302 may have one level of focus while AR object 304 and frame object 306 have other levels (or another level) of focus. With AR object 304 in focus but being at the same approximate perceived depth or desired perceived depth as frame object 302 in the frame of arrangement 300, AR object 304 may appear out of place or fake, or may at the very least be distracting to the viewer, who would typically expect AR object 304 to be at approximately the same level of focus as frame object 302 (i.e., out of focus in this example).

FIG. 4 shows example arrangement 400, which provides improved AR content according to embodiments of the disclosure. As shown in FIG. 4, arrangement 400 includes camera 312, frame object 302, AR object 304, and frame object 306 as shown in FIG. 3. In arrangement 400, however, the focus level of AR object 304 has been modified to better match or fit with the focus level of frame object 302 (i.e., to be out of focus in this example), thus providing a more realistic and less distracting visual.

FIG. 5 shows example arrangement 500, which includes camera 312, frame object 302, AR object 304, and frame object 306. As shown in FIG. 5, in arrangement 500, frame object 302 may be closer than frame object 306 to camera 312. In some cases, this may result in different levels of focus being applied as between frame objects 302 and 306. For example, camera 312 in arrangement 500 is focusing on frame object 302, where frame object 306 is in the background and out of focus.

AR object 304 is shown in example arrangement 500 as being closer to camera 312 than both frame object 302 and frame object 306. As is indicated in FIG. 5, in this case, frame object 302 and AR object 304 are in focus initially, while frame object 306 is out of focus. With AR object 304 in focus but being closer to camera 312 as compared to both frame object 302 and frame object 306 in the frame of arrangement 500, AR object 304 may appear out of place or fake, or may at the very least be distracting to the viewer, who would typically expect AR object 304 to be at a different level of focus from frame object 302 (i.e., out of focus in this example).

FIG. 6 shows example arrangement 600, which provides improved AR content according to embodiments of the disclosure. As shown in FIG. 6, arrangement 600 includes camera 312, frame object 302, AR object 304, and frame object 306 as shown in FIG. 5. In arrangement 600, however, the focus level of AR object 304 has been modified to better comport with the expected level of focus given the focus levels of frame objects 302 and 306 (i.e., to be out of focus in this example), thus providing a more realistic and less distracting visual. In this particular example, frame object 302 in the middle ground is in focus, while AR object 304 in the foreground and frame object 306 in the background are out of focus. By way of example, and as will be described in further detail herein, the level of focus for AR object 304 in arrangement 600 may be determined using extrapolation, with at least the levels of focus of frame objects 302 and 306 serving as inputs.

FIG. 7 shows example arrangement 700, which includes camera 312, frame object 302, AR object 304, and frame object 306. As shown in FIG. 7, in arrangement 700, frame object 302 may be closer than AR object 304 and frame object 306 to camera 312. In some cases, this may result in a different level of focus being applied as between frame objects 302 and 306. For example, camera 312 in arrangement 700 is focusing on frame object 302 in the foreground, where frame object 306 is in the background and out of focus.

AR object 304 is shown in example arrangement 700 as farther from camera 312 than frame object 302 and closer to camera 312 than frame object 306. As is indicated in FIG. 7, in this case, frame object 302 and AR object 304 are in focus initially, while frame object 306 is out of focus. With AR object 304 in focus but farther from camera 312 as compared to frame object 302 in the frame of arrangement 700, AR object 304 may appear out of place or fake, or may at the very least be distracting to the viewer, who would typically expect AR object 304 to be at a different level of focus from frame object 302 (i.e., more out of focus in this example).

FIG. 8 shows example arrangement 800, which provides improved AR content according to embodiments of the disclosure. As shown in FIG. 8, arrangement 800 includes camera 312, frame object 302, AR object 304, and frame object 306 as shown in FIG. 7. In arrangement 800, however, the focus level of AR object 304 has been modified to better comport with the expected level of focus given the focus levels of frame objects 302 and 306 (i.e., has been adjusted to be somewhat out of focus, but less out of focus than frame object 306 in this example), thus providing a more realistic and less distracting visual. In this particular example, frame object 302 in the foreground is in focus, while AR object 304 middle ground is somewhat out of focus, and frame object 306 in the background is out of focus. By way of example, and as will be described in further detail herein, the level of focus for AR object 304 in arrangement 800 may be determined using interpolation, with at least the levels of focus of frame objects 302 and 306 serving as inputs.

FIG. 9 shows example arrangement 900, which includes camera 312, frame object 302, AR object 304, and frame object 306. As shown in FIG. 9, in arrangement 900, frame object 302 may be closer than AR object 304 and frame object 306 to camera 312. In some cases, this may result in a different level of focus being applied as between frame objects 302 and 306. For example camera 312 in arrangement 900 is focusing on frame object 302 in the foreground, where frame object 306 is in the middle ground and at least somewhat out of focus.

AR object 304 is shown in example arrangement 900 as farther from camera 312 than frame object 302 and frame object 306. As is indicated in FIG. 9, in this case, frame object 302 and AR object 304 are in focus initially, while frame object 306 is out of focus. With AR object 304 in focus but farther from camera 312 than frame objects 302 and 306 in the frame of arrangement 900, AR object 304 may appear out of place or fake, or may at the very least be distracting to the viewer, who would typically expect AR object 304 to be at a different level of focus from frame object 302 (i.e., more out of focus than frame object 306 in this example).

FIG. 10 shows example arrangement 1000, which provides improved AR content according to embodiments of the disclosure. As shown in FIG. 10, arrangement 1000 includes camera 312, frame object 302, AR object 304, and frame object 306 as shown in FIG. 9. In arrangement 1000, however, the focus level of AR object 304 has been modified to better comport with the expected level of focus given the focus levels of frame objects 302 and 306 (i.e., has been adjusted to be more out of focus than frame object 306 in this example), thus providing a more realistic and less distracting visual. In this particular example, frame object 302 in the foreground is in focus, while frame object 306 in the middle ground is somewhat out of focus, and AR object 304 in the background is more out of focus than frame object 306. By way of example, and as will be described in further detail herein, the level of focus for AR object 304 in arrangement 1000 may be determined using extrapolation, with at least the levels of focus of frame objects 302 and 306 serving as inputs.

One of skill in the art will appreciate, upon studying the present disclosure, that given the above illustrated examples, the present disclosure contemplates and includes many additional example arrangements, whether or not the same are expressly described here.

FIGS. 11A through 11K illustrate flow diagrams depicting various operations of methods 1100 and 1140, respectively, and accompanying embodiments for generating improved AR content in accordance with aspects of the present disclosure. Generally, methods 1100 and 1140 provide improved AR content, including where such AR content may appear to be more realistic and less distracting, and including, by way of example, where such improved AR content includes an AR object that, in terms of characteristics such as focus, is better matched, fit with, or related to frame objects that may be associated or grouped with the AR object. The operations of the various methods described herein are not necessarily limited to the order described or shown in the figures, and one of skill in the art will appreciate, upon studying the present disclosure, variations of the order of the operations described herein that are within the spirit and scope of the disclosure.

The operations and sub-operations of methods 1100 and 1140 may be carried out, in some cases, by one or more of the components, elements, devices, modules, and circuitry of environments 100, electronic device 102, instructions 208, AR component 210, camera 212, processor/circuitry 214, connectivity interface 202, remote device 104, server system 108, and/or computing module 1200, etc. described herein and referenced with respect to at least FIGS. 1, 2, 11A-11K, and 12, as well as sub-components, elements, devices, modules, and circuitry depicted therein and/or described with respect thereto. In such instances, the description of methods 1100 and/or 1140 may refer to a corresponding component, element, etc., but regardless of whether an explicit reference is made, one of skill in the art will recognize, upon studying the present disclosure, when the corresponding component, element, etc. may be used. Further, it will be appreciated that such references do not necessarily limit the described methods to the particular component, element, etc. referred to. Thus, it will be appreciated by one of skill in the art that aspects and features described above in connection with (sub-) components, elements, devices, modules, and circuitry, etc., including variations thereof, may be applied to the various operations described in connection with methods 1100 and/or 1140 without departing from the scope of the present disclosure.

Figure 11A:
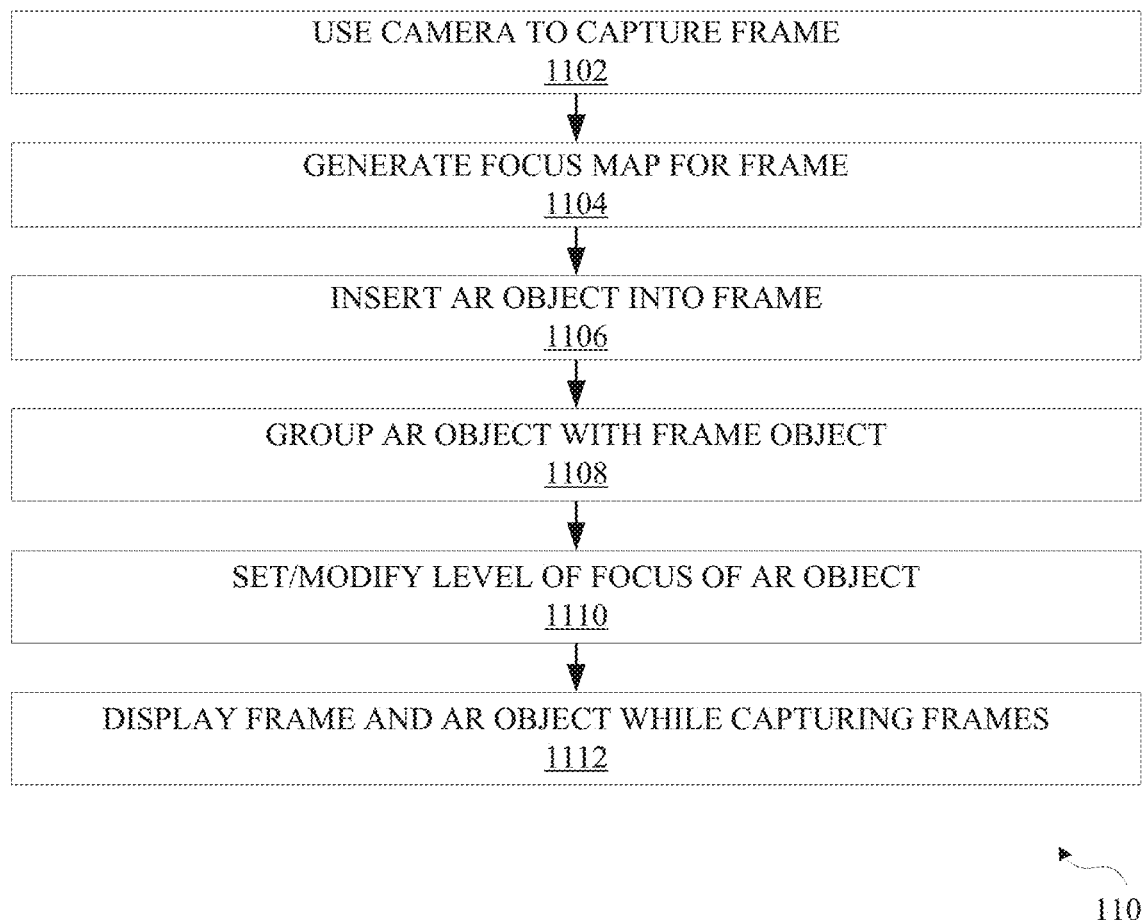
FIG. 11A is an operational flow diagram illustrating various operations that may be performed in accordance with embodiments of the disclosure.

Referring now to FIG. 11A, aspects of method 1100 for generating improved augmented reality content are depicted. At operation 1102, method 1100 optionally includes using a camera to capture a frame. In embodiments, camera 212 of electronic device 102 (referencing FIG. 1B by way of example) is used to capture the frame. In embodiments, the camera used to capture the frame is implemented as part of remote device 104 (referencing FIG. 1A for example). In embodiments, a camera may be used to capture the frame, and then the frame can be uploaded to server system 108 and stored in storage 112 for later download to electronic device 102 via communication media 106. The frame may be a photograph, and/or a series of frames may be captured by the camera and used to form video content (e.g., camera 212 may be a video camera that captures a series of frames).

In embodiments, the frame that may be captured at operation 1102 includes one or more frame objects. As described above in connection with FIGS. 3 to 10, the frame object may be any real-world object capturable by, for example, camera 212. The frame may be part of a still photograph or video content. In embodiments, capturing the frame at operation 1102 involves capturing and/or the generation of frame data that represents the frame. For example the frame data may include information representing color characteristics of frame objects, including, for example, hue, saturation, and/or luminance, and the like; spatial, positional, depth, or dimensional characteristics of frame objects, which in some cases may be estimated; lighting characteristics; encoding characteristics, including, for example, compression technique, speed, resolution, etc.; and other characteristics of frame objects (e.g., shape etc.).

At operation 1104, method 1100 includes generating a focus map using the frame data. The focus map includes a level of focus for one or more frame objects in the frame. For example, the frame data may indicate a discrete level of focus for each frame object, and this may be represented in the focus map. As such, the focus map can provide a level of focus for each of the frame objects (e.g., on a numerical scale of 1 to 10). In embodiments, the focus map may be generated for a number of planes in the frame, where each plane is roughly at the same level of focus). In embodiments, the focus map may be generated for a number of regions or sectors in the frame, where each region or sector is roughly at the same level of focus.

In embodiments, the focus map includes more granular focus information, for example, each pixel or cluster of pixels in a frame may be associated with its own level of focus. In embodiments, a focus profile may be generated using the frame data, where levels of focus are determined at a more granular level than the frame object level but at a less granular level than the pixel level. The granularity may vary for different objects or sectors in the frame. The granularity may depend upon the composition of the frame, including the depth of field, and the nature of the frame objects may depend on the image resolution, and/or may depend on the quality of the camera used to capture the frame. It should be appreciated here, that in embodiments, additional frame characteristics may be mapped using the frame data. By way of example, the frame data can be used to generate color maps, depth maps, lighting or shading maps, resolution maps, etc.

In some cases, multiple cameras may be used to generate the frame data. Depth sensors may also be employed. For example, camera 212 may include a camera array, and electronic device 102 may include cameras 212 at different orientations or positions and/or cameras 212 may employ different configurations/settings. Thus, the frame data may include a three-dimensional mesh or model of the frame captured using one or more cameras and/or depth sensors or the like. In embodiments, computer vision may be employed to scan data from the frame or may be employed in connection with camera 212 capturing the frame, such that certain data is captured that can be used to make a three-dimensional model of the frame. This may involve three-dimensional markers and the like being associated with points in the frame, such that expected perceived depths can be estimated.

With further reference to FIG. 11A, method 1100 optionally includes, at operation 1106, inserting an augmented reality object into the frame (e.g., AR object 254, referencing FIG. 2; AR object 304, referencing FIGS. 3-10). The AR object may be inserted at any location in the frame. In embodiments, the AR object may be inserted at a default position and subsequently moved. In embodiments, the AR object may be positioned at a location in the frame using frame data and/or information regarding the AR object. For example, certain applications that may be facilitated using instructions 208 (with reference to FIG. 1B) may automatically determine where the AR object should be positioned in the frame based on the content of the frame and/or the nature of the AR object.

The AR object may have a level of focus associated therewith. The level of focus may be set to a default value, in embodiments. For example the default value may be used when initially inserting the AR object into the frame. In some cases, the initial level of focus may be fully focused. In some cases, the initial level of focus for the AR object may be less than fully focused (e.g., may be set on a numerical scale of 1 to 10, where 10 is fully focused). For example, depending upon the frame data, and the position where the AR object is expected to be inserted, the level of focus of the AR object may be adjusted accordingly (e.g., to match or fit with surrounding frame objects, and/or as elsewhere described herein) before being inserted. In embodiments, the level of focus may be a single numerical value. In embodiments, the level of focus may be a distribution of focus values for the AR object, where different focus values may be applied at different locations on the AR object, such that, for example, certain aspects of the AR object may be in focus while other aspects of the AR object may be less focused.

At operation 1108, method 1100 includes grouping the AR object with at least one of the frame objects. For example, this grouping may involve pairing or otherwise associating the AR object with the frame objects. In embodiments, operation 1108 may involve grouping the AR object with a first frame object and a second frame object. This grouping or association may be a manual process that involves user input or an automated process within electronic device 102. For example, AR component 210 may group one or more frame objects with the AR object by selecting frame objects that are expected to have a similar level of focus as the AR object. In another example, AR component 210 may group one or more frame objects with the AR object by selecting frame objects that are expected to provide a spectrum of focus levels that may be more suitably used with an interpolation or extrapolation in order to determine the appropriate level of focus for the AR object.

Turning now to FIGS. 11B and 11C, embodiments of operation 1108 are shown. FIG. 11B shows that, in embodiments, grouping the augmented reality object with the frame object(s) at operation 1108 may include, at operation 1120, using an estimated proximity of the AR object to the frame object(s). For example, the AR object may be inserted in the frame in relatively close proximity to certain frame objects in the frame, and may be grouped with such objects. In embodiments, the frame objects may be at various locations relative to the AR object as inserted, such that the AR object may be grouped with, for example the two closest frame objects. In embodiments, the AR object may be grouped with one frame object that is in closer proximity to the AR object and another frame object that is farther away. In embodiments, the AR object may be grouped with a frame object that is between the AR object and the camera, in terms of the arrangement or intended perception of the frame, and may be additionally grouped with the frame object that is perceived to be farther away from the AR object vis-à-vis the camera. By grouping the AR object with different frame objects at different positions, focus levels for the AR object may be determined using interpolation or extrapolation as discussed herein.

FIG. 11C shows that, in embodiments, grouping the AR object with the frame object(s) at operation 1108 may include, at operation 1122, using an estimated depth of the AR object and an estimated depth for the frame object(s). For example, each frame object in the frame may be assigned an estimated depth, as described above. As such, where the frame objects include first and second frame objects, the first frame object may have a first estimated depth and the second frame object may have a second estimated depth, and these depths can be used in connection with grouping the AR object with frame object(s).

Operation 1122 may be accomplished in a variety of ways. In embodiments, estimated depths may be assigned using depth maps, depth masks that may be created in connection with image processing, using computer vision, and/or using artificial intelligence. Artificial intelligence may be employed in connection with AR component 210 (referring to FIG. 1B for example) in order to map regions of a frame and associate the regions with levels of focus and/or expected perceived depth or estimated actual depth in the frame, and thus modify an AR object inserted into the frame. For example, AR component 210 can employ artificial intelligence to analyze a captured frame and determine a level of focus for regions of the frame. In embodiments, electronic device 102 may download a software design kit for AR component 210, where the software design kit can be used to generate focus maps or depth maps for captured frames. In embodiments, depth maps and/or depth masks may be derived using color masks that may have been created for a particular image or video.

The estimated depth for a given frame object may represent the intended perceived depth of the object from the camera, the intended perceived depth relative to other frame objects in the frame, and/or the intended perceived depth ordering of frame objects in the frame. Estimated depth may be derived using depth cues in the image, such as color, shading, occlusions, and/or object size. In some cases, estimated depth may be assigned to frame objects manually or semi-manually. As such, in embodiments, the AR object may be grouped with one or more frame objects that have the same or a similar estimated depth as the AR object. In embodiments, the AR object may be grouped with frame object(s) having differing estimated depths. For example, the AR object may be grouped with one frame object having a relatively small estimated depth, which may be smaller than the estimated depth of the AR object, and with another frame object having an estimated depth that is relatively large, for example larger than the estimated depth of the AR object, such that interpolation may be used to determine the level of focus to apply to the AR object. Additional examples of how estimated depths may be used in connection with grouping the AR object with one or more frame objects will be clear to one of ordinary skill in the art upon studying the present disclosure, including for example FIGS. 3 to 10.

Referring back to FIG. 11A, method 1100 includes, at operation 1110, using the focus map for the at least one frame object grouped with the AR object to cause a modification to the level of focus for the AR object, including in connection with generating improved AR content according to embodiments of the disclosure. For example, the modification to the level of focus for the AR object may cause the AR object to look more realistic and/or less distracting in the context of the frame. This may involve setting or modifying the level of focus for the AR object. By way of example, motivations and scene arrangements for setting/modifying the level of focus for the AR object, are provided above in connection with FIGS. 3 to 10. The modification to the level of focus may increase a match or fit or improve a relationship between/among the level of focus for the AR object and the level of focus for frame object(s) that may be grouped with the AR object. In embodiments, the modification to the level of focus for the AR object may involve setting the level of focus to a value that provides more realistic and/or less distracting AR content.

Turning now to FIGS. 11D through 11G, embodiments of operation 1110 are shown. FIG. 11D shows that, in embodiments, using the focus map to cause a modification to the level of focus for the AR object at operation 1110 may include, at operation 1124, determining the level of focus for the AR object using interpolation or extrapolation. With reference to FIG. 8, by way of example, frame object 302 may be in focus and frame object 306 may be out of focus, and by interpolating the level of focus for frame objects 302 and 306, an adjusted level of focus may be determined for and applied to AR object 304.

In some cases the interpolation may alternatively or additionally use the estimated depths of the first and second frame objects to determine the level of focus for the AR object. For example, there may be an estimated depth for the AR object, and there may be respective first and second estimated depths for the first and second frame objects. If the estimated depth for the AR object first estimated depth is greater than the first estimated depth and less than the second estimated depth (e.g., as shown in arrangement 700 of FIG. 7), then an interpolation of the levels of focus for the first and second frame objects may be used to determine the level of focus for the AR object given the relationship among the estimated depths.

Extrapolation may be used where appropriate. With reference to FIG. 10, by way of example, frame object 302 may be in focus and frame object 306 may be out of focus, and by extrapolating the level of focus for frame objects 302 and 306, an adjusted level of focus may be determined for AR object 304. In this case, the extrapolated, adjusted level of focus for AR object 304 may be less in focus than the level of focus for frame object 306. In some cases the extrapolation may alternatively or additionally use the estimated depths of the first and second frame objects to determine the level of focus for the AR object. If the estimated depth for the AR object is less than the first estimated depth and the second estimated depth or is greater than both the first estimated depth and the second estimated depth (e.g., referencing arrangement 900 of FIG. 9), then an extrapolation of the levels of focus for the first and second frame objects may be used to determine the level of focus for the AR object given the relationship among the estimated depths.

FIG. 11E shows that, in embodiments, using the focus map to cause a modification to the level of focus for the AR object at operation 1110 may include, at operation 1130, increasing a match or fit between the level of focus for the frame object(s) and the level of focus for the AR object. For example, referring back to FIGS. 3 and 4, whereas in arrangement 300, frame object 302 is out of focus but AR object 304 at roughly the same depth as frame object 302 is in focus, in arrangement 400 after the modification to the level of focus for AR object 304, the levels of focus are at least roughly matched, such that both frame object 302 and AR object 304 are out of focus.

In embodiments, as shown in FIG. 11F, using the focus map to cause a modification to the level of focus for the AR object at operation 1110 may include, at operation 1132, controlling the level of focus for the AR object to converge within a predetermined range defined by first and second threshold levels of focus within a certain tolerance. For example, the first and second threshold levels of focus may be set around a target level of focus for the AR object. The target level of focus for the AR object may be determined using a level of focus for any frame object grouped with the AR object, for example in order to better match the level of focus of the AR object with the level of focus of a frame object, or through interpolation or extrapolation to improve the fit of the level of focus of the AR object with the level of focus of a frame object. Then, the first and second threshold levels of focus can be set around the target level of focus to allow for some amount of imprecision in determining the modification to the level of focus for the AR object. For example, it may be determined that so long as the modified level of focus for the AR object is within the first and second threshold levels of focus, the AR content will appear to be sufficiently realistic and sufficiently not distracting. In example implementations, the first and second threshold levels of focus may be set at plus and minus 10% of the target level of focus. Once the first and second threshold levels of focus are determined, a feedback mechanism can be employed in connection with modifying the level of focus for the AR object, such that the level of focus for the AR object can be iteratively adjusted to converge within the predetermined range defined by the first and second threshold levels of focus. In embodiments, the range may be adjustable, programmable, variable, and/or adaptable to account for variations within the frame or variations with respect to the AR object on the fly.

FIG. 11G shows that for embodiments of method 1100, using the focus map to cause a modification to the level of focus for the AR object at operation 1110 may include, at operation 1134, setting the level of focus of the AR object to be within a range of the level of focus for one or more of the frame objects. For example, referring back to FIGS. 3 and 4, whereas in arrangement 300, frame object 302 is out of focus but AR object 304 at roughly the same depth as frame object 302 is in focus, in arrangement 400 after the modification to the level of focus for AR object 304, the levels of focus are at least roughly matched, such that both frame object 302 and AR object 304 are out of focus and the level of focus of AR object 304 may be within a range of the level of focus for frame object 302. The level of focus for frame object 302 may be represented as a numerical value. The numerical value represent a statistical indication of the level of focus for frame object 302, such as the mean or median value of an array of levels of focus that may apply to frame object 302, and in some cases may account for standard deviation or other statistical characteristics. The level of focus of AR object 304 may be set to be within a certain percentage range of the level of focus for frame object 302, within an absolute range of the level of focus for frame object 302, within a certain number of standard deviations of the mean or median value of the level of focus for frame object 302, etc. The range for the level of focus may vary or adapt depending upon various factors, including for example the composition/arrangement of the frame, the relative size or characteristics of the AR object 304 and/or frame object 302, etc.

Referring again to FIG. 11A, method 1100 optionally includes, at operation 1112, displaying the frame and the AR object as modified (e.g., to better match or fit/comport with a frame object grouped with the AR object) while the camera is capturing the one or more frame objects. In example implementations, displaying the frame and the AR objects as modified may be done using a display of user interface 218, with reference to FIG. 1B. Further referencing FIG. 1B, in embodiments, camera 212 is used to capture the frame objects. In situations where the user is using electronic device 102 and camera 212 to record still images or video content of objects in the surrounding environment, AR object 302 can be adjusted appropriately (e.g., in terms of focus) and displayed to user in real time or near real time (on the fly), in order for the resulting AR content to appear more realistic and less distracting in the image.

Figure 11H:
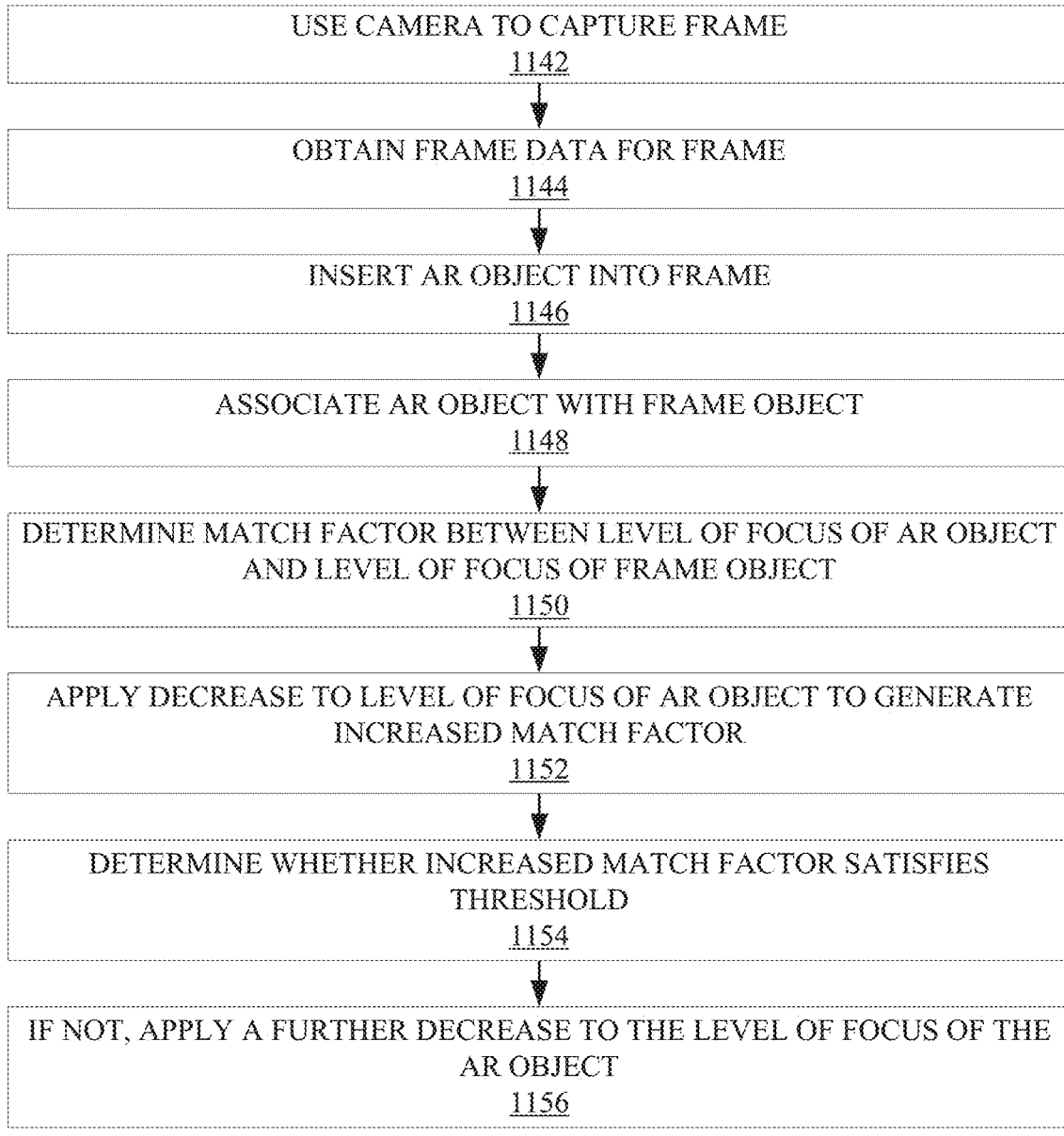
FIG. 11H is an operational flow diagram illustrating various operations that may be performed in accordance with embodiments of the disclosure.

Referring now to FIG. 11H, aspects of method 1140 for generating improved augmented reality content are depicted. At operation 1142, method 1140 optionally includes using a camera to capture one or more frames. In embodiments, camera 212 of electronic device 102 (referencing FIG. 1B by way of example) is used to capture the one or more frames. In embodiments, the camera used to capture the frame is implemented as part of remote device 104 (referencing FIG. 1A for example). The camera may be adapted to capture frames in the form of photographs and/or may be adapted to capture a series of frames in the form of video content.

At operation 1144, method 1140 includes obtaining frame data for a frame of the one or more frames captured using the camera (at operation 1142). The frame data includes a level of focus for one or more frame objects in the frame. As alluded to above, the frame data for a frame object may include a distribution of focus levels for a given object, and in some cases may be used to generate statistical values representing the distribution. At operation 1146, method 1140 includes inserting an AR object into the frame. With reference to FIG. 3, for example, AR object 304 may be inserted into the frame in relative proximity to frame object 302. Looking at FIG. 2, for example, AR object 254 may be inserted in relative proximity to frame object 252.

Method 1140 also includes, at operation 1148, associating the AR object with at least one of the one or more frame objects. The one or more frame objects may or may not be in relative proximity to the AR object. Referencing FIG. 6, by way of example, AR object 304 may be associated with frame object 302 or frame object 306 or both. Embodiments of the disclosure involve matching or improving the fit of the level of focus as between the AR object and a frame object associated with the AR object. In some cases, therefore, the AR object may be associated with the frame object based on the relative proximity of the AR object to the frame object, and/or based on a proxy for the level of focus expected for the AR object and the frame object (such as, for example, expected or desired perceived depth, size, etc. for the AR object and the frame object). The relative proximity and/or the proxy (e.g., expected/desired perceived depth) may be estimated and need not be exact. Here, it should also be appreciated that, in some cases, the AR object may be associated with at least one or more of the frame objects (at operation 1148) before the AR object is inserted into the frame (at operation 1146).

At operation 1150, method 1140 may include determining a match or fit factor between a level of focus of the AR object and the level of focus of the frame object(s) associated with the AR object. It should be appreciated that in some cases, a fit factor may include a match factor but the opposite may not be true. For example, a match factor may indicate that the levels of focus should be similar, while a fit factor may account for situations where the levels of focus should comport with a certain relationship expected for a more realistic frame appearance. The match or fit factor may be a numerical representation of how the level of focus of the AR object compares to the level of focus for the frame object(s). For example, referencing FIG. 3, if the level of focus of AR object 304 (which is in focus in this example) is relatively more different from the level of focus of frame object 302 (which is out of focus in this example), the match or fit factor may be relatively lower. Also, for example, referencing FIG. 4, if the level of focus of AR object 304 and frame object 302 are relatively closer to one another (e.g., here both frame object 302 and AR object 304 are out of focus), the match or fit factor may be relatively higher. In embodiments, the match or fit factor may be an array or matrix of multiple data points, each representing a matching or fitting of the level of focus of the AR object 304 to associated frame objects at a more granular level.

If it is determined that the match or fit factor does not satisfy a threshold, at operation 1152, method 1140 involves applying a decrease to the level of focus of the AR object in order to generate an increased match or fit factor. In embodiments, the inserted AR object may typically have a higher level of focus than, or the same level of focus as, the associated frame object(s). Thus, in certain situations the level of focus of the AR object should be decreased in order to better match or fit the focus level of the AR object to that of the frame object. It should be appreciated, however, that in certain situations, the level of focus of the AR object should be increased in order to better match or fit the level of focus of the associated frame object(s). For example, the AR object's level of focus may be increased if the AR object is less in focus than the associated frame object(s). This may occur upon insertion of the AR object, or during a process of modifying the level of focus of the AR object (e.g., an iterative process or a process that employs feedback to modify the level of focus of the AR object). By way of example, if feedback is used to modify the level of focus of the AR object to converge to a desired value, the level of focus of the AR object may be decreased beyond the desired value, and the level of focus of the AR object should as a result be increased to better match the desired value.

The threshold may be a single numerical value to which the level of focus of the AR object as compared, or may be a series of numerical values to which aspects of the level of focus of the AR object are compared. For example, different points on the AR object may be associated with different levels of focus, some such levels of focus may be comparable to corresponding levels of focus of the frame object(s) while other levels of focus of the AR object may be comparable to other corresponding levels of focus of the frame object(s).

In embodiments, method 1140 further includes, at operation 1154, responsive to the decrease applied to the level of focus of the AR object, determining whether the increased match or fit factor satisfies the threshold. If the increase match or fit factor does not satisfy the threshold, embodiments of method 1140 include, at operation 1156, applying a further decrease to the level of focus of the AR object. It should also be appreciated that where the level of focus is being increased, operation 1156 may involve further increasing the level of focus of the AR object depending upon the assessment of the match or fit factor. As such, operations 1150 through 1156 may be used in an iterative or recurring process for setting/modifying the level of focus of an AR object in order to provide AR content that appears to be more realistic and/or less distracting.

Figure 11J:
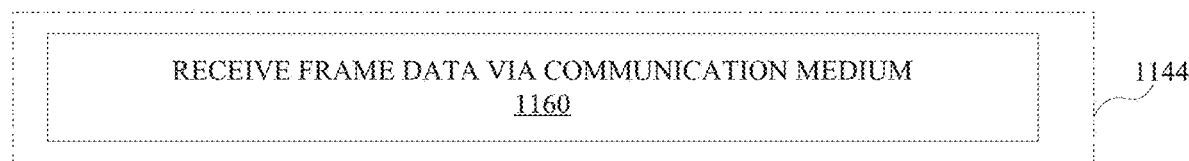
FIG. 11J is an operational flow diagram illustrating additional aspects of operations that may be performed in accordance with additional embodiments of the disclosure.

FIG. 11J shows that, in embodiments, obtaining frame data for the frame that may be captured using the camera at operation 1144 may include, at operation 1160, receiving the frame data via a communication medium. Referencing FIGS. 1A and 1B for example, as mentioned above, the camera used to capture at least part of the frame may be remote from electronic device 102. The camera may be embedded in remote device 104 that may be couplable to electronic device 102 via communication media 106. The remote camera may thus be used to capture at least part of the frame and communicate the captured content to electronic device 102. Server system 108 may be employed as an intermediary that is coupled to both electronic device 102 and remote device 104 and can pass information between those devices (including, e.g., tethering or hotspot configurations). In embodiments, server system 108 need not be an intermediary per se, but may simply provide electronic device 102 with frame content (e.g., streaming content) into which AR objects may be inserted, modified, etc., according to embodiments described herein.

Figure 11K:
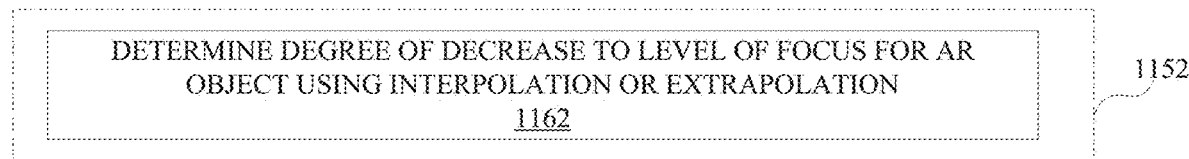
FIG. 11K is an operational flow diagram illustrating additional aspects of operations that may be performed in accordance with additional embodiments of the disclosure.

As shown in FIG. 11K, in embodiments of method 1140, applying the decrease to the level of focus of the AR object in order to generate an increased match or fit factor at operation 1152 may include, at operation 1162, determining a degree of decrease to be applied to the level of focus of the AR object using either interpolation or extrapolation. In embodiments, the AR object may be associated with first frame object and a second frame object, where the first frame object has a first level of focus and the second frame object has a second level of focus. The interpolation or extrapolation may be performed to determine the degree of decrease to apply to level of focus for the AR object using the first and second levels of focus.

Figure 12:
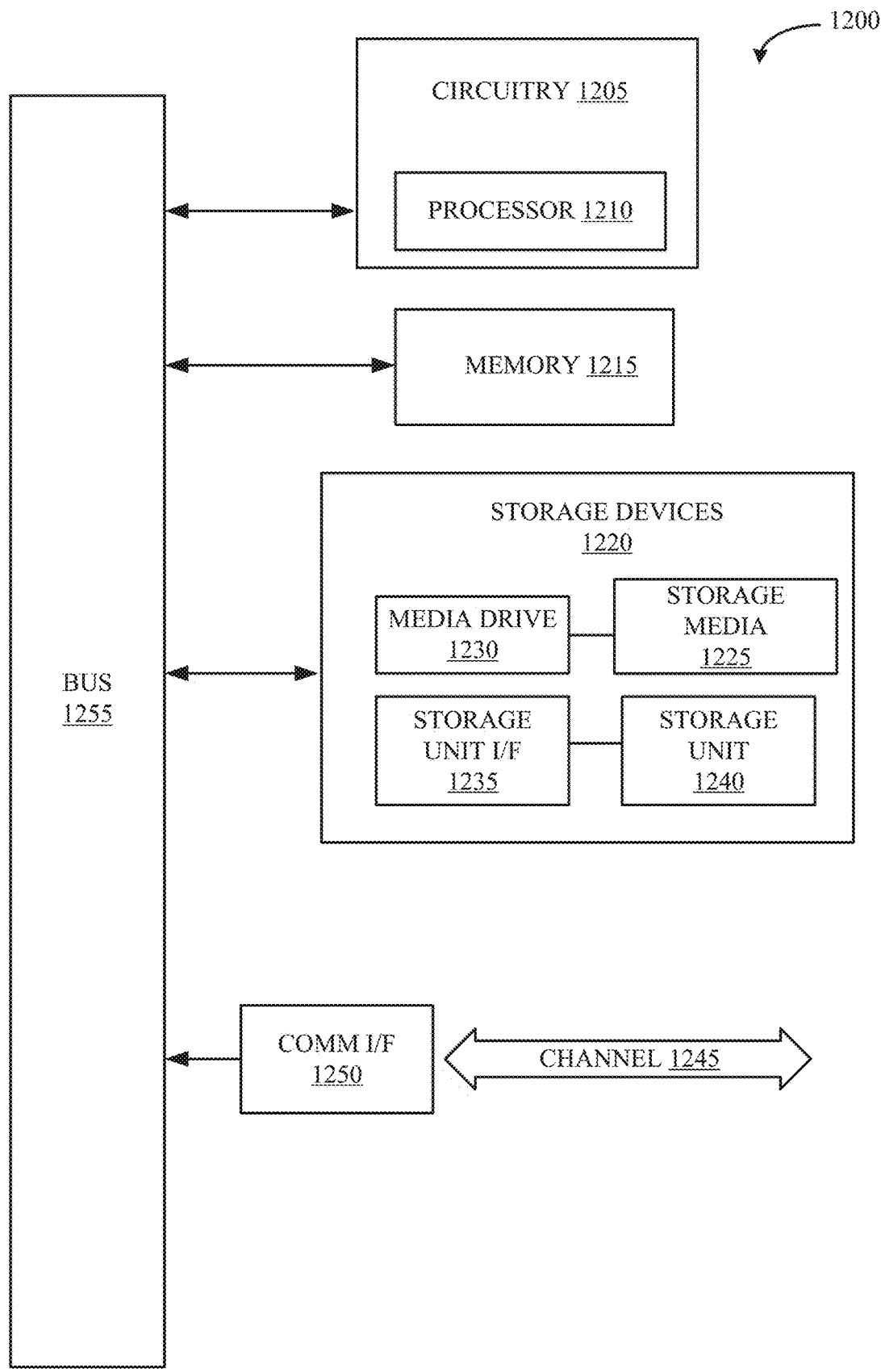
FIG. 12 illustrates an example computing module that may be used to implement features of various embodiments of the disclosure.

FIG. 12 illustrates example computing module 1200, which may in some instances include a processor/controller resident on a computer system (e.g., server system 108, electronic device 102, and/or remote device 108). Computing module 1200 may be used to implement various features and/or functionality of embodiments of the systems, devices, and methods disclosed herein. With regard to the above-described embodiments set forth herein in the context of systems, devices, and methods described with reference to FIGS. 1A through 11K, including embodiments involving electronic device 102, remote device 104, and/or server system 108, one of skill in the art will appreciate additional variations and details regarding the functionality of these embodiments that may be carried out by computing module 1200. In this connection, it will also be appreciated by one of skill in the art upon studying the present disclosure that features and aspects of the various embodiments (e.g., systems) described herein may be implemented with respected to other embodiments (e.g., methods) described herein without departing from the spirit of the disclosure.

As used herein, the term module may describe a given unit of functionality that may be performed in accordance with one or more embodiments of the present application. As used herein, a module may be implemented utilizing any form of hardware, software, or a combination thereof. For example, one or more processors, controllers, ASICs, PLAs, PALs, CPLDs, FPGAs, logical components, software routines or other mechanisms may be implemented to make up a module. In implementation, the various modules described herein may be implemented as discrete modules or the functions and features described may be shared in part or in total among one or more modules. In other words, as would be apparent to one of ordinary skill in the art after reading this description, the various features and functionality described herein may be implemented in any given application and may be implemented in one or more separate or shared modules in various combinations and permutations. Even though various features or elements of functionality may be individually described or claimed as separate modules, one of ordinary skill in the art will understand upon studying the present disclosure that these features and functionality may be shared among one or more common software and hardware elements, and such description shall not require or imply that separate hardware or software components are used to implement such features or functionality.

Where components or modules of the application are implemented in whole or in part using software, in embodiments, these software elements may be implemented to operate with a computing or processing module capable of carrying out the functionality described with respect thereto. One such example computing module is shown in FIG. 12. Various embodiments are described in terms of example computing module 1200. After reading this description, it will become apparent to a person skilled in the relevant art how to implement example configurations described herein using other computing modules or architectures.

Referring now to FIG. 12, computing module 1200 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing module 1200 is specifically purposed.

Computing module 1200 may include, for example, one or more processors, controllers, control modules, or other processing devices, such as a processor 1210, and such as may be included in circuitry 1205. Processor 1210 may be implemented using a special-purpose processing engine such as, for example, a microprocessor, controller, or other control logic. In the illustrated example, processor 1210 is connected to bus 1255 by way of circuitry 1205, although any communication medium may be used to facilitate interaction with other components of computing module 1200 or to communicate externally.

Computing module 1200 may also include one or more memory modules, simply referred to herein as main memory 1215. For example, random access memory (RAM) or other dynamic memory may be used for storing information and instructions to be executed by processor 1210 or circuitry 1205. Main memory 1215 may also be used for storing temporary variables or other intermediate information during execution of instructions to be executed by processor 1210 or circuitry 1205. Computing module 1200 may likewise include a read only memory (ROM) or other static storage device coupled to bus 1255 for storing static information and instructions for processor 1210 or circuitry 1205.

Computing module 1200 may also include one or more various forms of information storage devices 1220, which may include, for example, media drive 630 and storage unit interface 1235. Media drive 1230 may include a drive or other mechanism to support fixed or removable storage media 1225. For example, a hard disk drive, a floppy disk drive, a magnetic tape drive, an optical disk drive, a CD or DVD drive (R or RW), or other removable or fixed media drive may be provided. Accordingly, removable storage media 1225 may include, for example, a hard disk, a floppy disk, magnetic tape, cartridge, optical disk, a CD or DVD, or other fixed or removable medium that is read by, written to or accessed by media drive 1230. As these examples illustrate, removable storage media 1225 may include a computer usable storage medium having stored therein computer software or data.

In alternative embodiments, information storage devices 1220 may include other similar instrumentalities for allowing computer programs or other instructions or data to be loaded into computing module 1200. Such instrumentalities may include, for example, fixed or removable storage unit 1240 and storage unit interface 1235. Examples of such removable storage units 1240 and storage unit interfaces 1235 may include a program cartridge and cartridge interface, a removable memory (for example, a flash memory or other removable memory module) and memory slot, a PCMCIA slot and card, and other fixed or removable storage units 1240 and storage unit interfaces 1235 that allow software and data to be transferred from removable storage unit 1240 to computing module 1200.

Computing module 1200 may also include a communications interface 1250. Communications interface 1250 may be used to allow software and data to be transferred between computing module 1200 and external devices. Examples of communications interface 1250 include a modem or softmodem, a network interface (such as an Ethernet, network interface card, WiMedia, IEEE 802.XX, or other interface), a communications port (such as for example, a USB port, IR port, RS232 port Bluetooth® interface, or other port), or other communications interface. Software and data transferred via communications interface 1250 may typically be carried on signals, which may be electronic, electromagnetic (which includes optical) or other signals capable of being exchanged by a given communications interface 1250. These signals may be provided to/from communications interface 1250 via channel 1245. Channel 1245 may carry signals and may be implemented using a wired or wireless communication medium. Some non-limiting examples of channel 1245 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 1215, storage unit interface 1235, removable storage media 1225, and channel 1245. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing module 1200 or a processor to perform features or functions of the present application as discussed herein.

Various embodiments have been described with reference to specific example features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various example embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the present application, whether or not such embodiments are described and whether or not such features are presented as being a part of a described embodiment. Thus, the breadth and scope of the present application should not be limited by any of the above-described example embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide illustrative instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed in multiple groupings or packages or across multiple locations.

Additionally, the various embodiments set forth herein are described in terms of example block diagrams, flow charts, and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:

1. An electronic device for generating improved augmented reality content, the electronic device comprising:
    a camera configured to capture a first frame;
    an augmented reality component coupled to the camera and a memory, wherein the memory stores instructions that, when executed, cause the augmented reality component to:
        obtain frame data for the first frame, the frame data comprising a three-dimensional marker associated with a location in the first frame;
        using the three-dimensional marker, determine an expected perceived depth of a frame object in the first frame;
        insert an augmented reality object into the first frame at the location, wherein a focus level of the augmented reality object is set to a default depth value;
        based on the location in the first frame, group the augmented reality object with the frame object in the first frame;
        modify the focus level of the augmented reality object to an approximate perceived depth, wherein the approximate perceived depth of the augmented reality object corresponds with the expected perceived depth of the frame object in the first frame; and
        while the camera is capturing a second frame, display the first frame and the augmented reality object to increase a fit between the focus level of the augmented reality object and the frame object are grouped with the augmented reality object.

2. The electronic device of claim 1, wherein the augmented reality object is displayed with the fit increased while the camera is capturing the second frame.

3. The electronic device of claim 1, wherein the approximate perceived depth of the augmented reality object is set to be within a range of values.

4. The electronic device of claim 1, wherein the augmented reality object is grouped with the frame object based on an estimated proximity of the augmented reality object to the frame object.

5. The electronic device of claim 1, wherein the first frame comprises a plurality of pixels, and wherein each of the plurality of pixels is associated with an individual focus level.

6. The electronic device of claim 1, wherein the frame data comprises a three-dimensional mesh of the first frame captured using a plurality of depth sensors.

7. The electronic device of claim 1, wherein the augmented reality component is further caused to:
    scan data associated with the first frame, using computer vision; and
    generate a three-dimensional model of the first frame, wherein the three-dimensional model of the first frame includes the three-dimensional marker.

8. A method for generating improved augmented reality content, the method comprising:
    generating a focus map using frame data for a first frame, the frame data comprising a frame object associated with a location in the first frame;
    using the focus map, determining an expected perceived depth of the frame object in the first frame;
    inserting an augmented reality object into the first frame at the location, wherein a focus level of the augmented reality object is set to a default depth value;
    based on the location in the first frame, grouping the augmented reality object with the frame object in the first frame;
    modifying the focus level of focus of the augmented reality object to an approximate perceived depth, wherein the approximate perceived depth of the augmented reality object corresponds with the expected perceived depth of the frame object in the first frame; and
    while a second frame is captured, displaying the first frame and the augmented reality object to cause a modification to the focus level of the augmented reality object.

9. The method of claim 8, wherein modifying the focus level of the augmented reality object increases a match between the expected perceived depth of the frame object and the approximate perceived depth of the augmented reality object.

10. The method of claim 8, wherein the focus level of focus of the augmented reality object converges within a range defined between a first threshold focus level and a second threshold focus level.

11. The method of claim 8, wherein grouping the augmented reality object with the frame object in the first frame comprises using an estimated proximity of the augmented reality object to the frame object in the first frame.

12. The method of claim 8, wherein grouping the augmented reality object with the frame object comprises using a first estimated depth for the augmented reality object and a second estimated depth for the frame object.

13. The method of claim 12, further comprising grouping the augmented reality object with a first frame object or a second frame object in addition to the frame object in the first frame.

14. The method of claim 8, wherein the focus level of the augmented reality object is determined using interpolation.

15. The method of claim 8, wherein the focus level of the augmented reality object is determined using extrapolation.

16. An electronic device for generating improved augmented reality content, the electronic device comprising circuitry coupled to a memory, wherein the memory stores instructions that, when executed, cause the circuitry to:
    obtain frame data for a first frame, the frame data comprising a three-dimensional marker associated with a location in the first frame;
    using the three-dimensional marker, determine an expected perceived depth of a frame object in the first frame;
    insert an augmented reality object into the first frame at the location, wherein a focus level of the augmented reality object is set to a default depth value;

based on the location in the first frame, associate the augmented reality object with the frame object in the first frame;

determine a fit factor between the focus level of the augmented reality object and the expected perceived depth of the frame object in the first frame;

responsive to the fit factor not satisfying a threshold, modify the focus level of the augmented reality object to an approximate perceived depth, wherein the approximate perceived depth of the augmented reality object corresponds with the expected perceived depth of the frame object in the first frame; and generate a second fit factor between the modified focus level of the augmented reality object and the approximate perceived depth.

17. The electronic device of claim 16, wherein the memory further stores instructions that, when executed, cause the circuitry to:

responsive to modification of the focus level of the augmented reality object, determine whether the second fit factor satisfies the threshold; and responsive to the second fit factor not satisfying the threshold, apply a decrease to the modified focus level of the augmented reality object.

18. The electronic device of claim 16, wherein a degree of modification of the focus level of the augmented reality object is determined using interpolation.

* * * * *